US009057893B2

(12) United States Patent
Motoya et al.

(10) Patent No.: US 9,057,893 B2
(45) Date of Patent: Jun. 16, 2015

(54) LIGHT CONTROL ELEMENT

(75) Inventors: Masayuki Motoya, Tokyo (JP);
Junichiro Ichikawa, Tokyo (JP);
Hiroshi Murata, Takarazuka (JP)

(73) Assignee: Sumitomo Osaka Cement Co., Ltd., Chiyoda-ku, Tokyo (JP)

(*) Notice: Subject to any disclaimer, the term of this patent is extended or adjusted under 35 U.S.C. 154(b) by 240 days.

(21) Appl. No.: 13/701,422

(22) PCT Filed: May 31, 2011

(86) PCT No.: PCT/JP2011/062485
§ 371 (c)(1),
(2), (4) Date: Nov. 30, 2012

(87) PCT Pub. No.: WO2011/152397
PCT Pub. Date: Dec. 8, 2011

(65) Prior Publication Data
US 2013/0071059 A1 Mar. 21, 2013

(30) Foreign Application Priority Data

May 31, 2010 (JP) ................. 2010-124589
May 31, 2010 (JP) ................. 2010-124608

(51) Int. Cl.
*G02F 1/035* (2006.01)
*G02B 6/12* (2006.01)
*G02F 1/225* (2006.01)

(52) U.S. Cl.
CPC ............ *G02F 1/035* (2013.01); *G02F 1/2255* (2013.01); *G02F 2203/15* (2013.01)

(58) Field of Classification Search
USPC .......................................... 385/1–9
See application file for complete search history.

(56) References Cited

U.S. PATENT DOCUMENTS 5,400,416 A 3/1995 Enokihara et al.
5,530,777 A 6/1996 Enokihara et al.
2006/0115226 A1 6/2006 Miyazaki et al.

FOREIGN PATENT DOCUMENTS

JP 6-110023 A 4/1994
JP 2004-246321 A 9/2004
(Continued)

OTHER PUBLICATIONS

Yu, M., et al., "Velocity Matched Resonant Slow-Wave Structure for Optical Modulator," Proceedings of Integrated Photonics Research, ITuH7-3, Mar. 22, 1993, pp. 365-369.
(Continued)

*Primary Examiner* — Akm Enayet Ullah
*Assistant Examiner* — Michael Mooney
(74) *Attorney, Agent, or Firm* — Taft Stettinius & Hollister LLP

(57) ABSTRACT

Provided is a light control element wherein stable operation at low driving voltage is possible. A light control element comprises a substrate (1) having an electro-optic effect, a plurality of optical waveguides (2) formed on said substrate (1), and a control electrode (3) which is formed on said substrate and controls the phase of the light that propagates through the optical waveguides (2), wherein the control electrode is provided with at least two resonance type electrodes (31, 32) having the same resonant frequencies, and power supply electrodes (41, 42) which supply a control signal to each resonance type electrode (31, 32); and the shape and forming position of each resonance type electrode (31, 32), and the supply position to each resonance type electrode (31, 32) according to the power supply electrode (41, 42) are set so as to allow odd mode coupling with respect to each other; and a control signal having the same phase or a prescribed phase difference is supplied to each resonance type electrode (31, 32) by the power supply electrode (41, 42).

15 Claims, 18 Drawing Sheets

(56) References Cited

FOREIGN PATENT DOCUMENTS

| | | |
|---|---|---|
| JP | 2004-287354 A | 10/2004 |
| JP | 2006-98885 A | 4/2006 |
| JP | 2007-333753 A | 12/2007 |
| JP | 2009-53444 A | 3/2009 |
| WO | 2006/025333 A1 | 3/2006 |

OTHER PUBLICATIONS

Krahenbuhl, R., et al., "Investigations on Short-Path-Length High-Speed Optical Modulators in LiNbO3 with Resonant-Type Electrodes," Journal of Lightwave Technology, vol. 19, No. 9, Sep. 2001, pp. 1287-1297.

LIGHT CONTROL ELEMENT

TECHNICAL FIELD

The present invention relates to a light control element, and particularly to a light control element having a resonant type electrode which modulates light waves propagating through an optical waveguide.

BACKGROUND ART

A light control element such as a resonant type optical modulator is used in a transmission device of an optical communication system such as an optical modulator for optical transmission of a high frequency signal of several GHz or more used for wireless communication, or a pulsar modulator for generating optical clocks used for long-haul transmission along with data modulation. A substrate material having an electro-optic effect such as lithium niobate is used for the resonant type optical modulator, and the intensity or a phase of light which propagates through an optical waveguide is modulated by varying a refractive index of the optical waveguide formed on the substrate using a control electrode having a resonant type electrode.

In the resonant type electrode, when an electric signal with a characteristic frequency is input from a feeding point thereto, a standing wave of the electric signal arises in the electrode. As such, since the resonant type optical modulator uses a resonance of an electric signal, it can be operated with high efficiency when a characteristic frequency is input thereto, and generally has higher modulation efficiency per unit length of electrode than a traveling wave type optical modulator.

With these characteristics, there are many cases where the length of an electrode of a resonant type optical modulator in the related art is designed to be shorter than one wavelength of an electric signal. However, under a condition in which the velocity of light propagating through the optical waveguide nearly matches the velocity of a control signal propagating through the electrode of an interaction regions, the electrode can be extended, and a driving voltage can be reduced proportional to the length of the electrode, within limitation of attenuation of the control signal.

NPL 1 discloses that using velocity matching and the resonant type electrode together is useful for improving efficiency, and, NPL 2 discloses a resonant electrode type optical modulator where lithium niobate is used for a substrate, and discloses a case where favorable characteristics are obtained by setting the refractive index (nm) of an electric signal to nearly 2.2 (the refractive index of lithium niobate to light is about 2.2).

On the other hand, under a condition in which velocities of the light and the electric signal do not match each other, the length of the electrode cannot be sufficiently extended, and, as a result, the total modulation efficiencies cannot be improved even if modulation efficiency per unit length is high. For this reason, a half wavelength voltage Vπ which is a parameter indicating efficiency of a modulator becomes approximately 10 V or more, and a sufficient operation cannot be achieved unless a very high voltage is applied.

In addition, a portion of the optical waveguide is branched into two paths so as to have a Mach-Zehnder (MZ) interferometer structure, which is operated as a light intensity modulator if two branched lightwaves are made to interfere with each other. In a pulsar modulator or the like for generating optical clocks used for long-haul transmission along with data modulation, a phase shift amount of light in the two branched light beams is preferably in a state where wavelength chirp is zero that is obtained by driving an operation through phase shifts of reverse signs with the same magnitude, and a signal of a reverse sign with the same magnitude is applied to each branched waveguide of the MZ interferometer. In addition, there is an effect of decreasing a driving voltage in a case of applying signals of reverse signs to each other to dual-electrodes corresponding to the respective branched waveguides (also referred to as a "dual-electrode type").

For this reason, if a dual-electrode type MZ modulator is formed using a long resonant type electrode where the velocities of the light and the control signal match each other, dramatic reduction of driving voltage is expected. However, the resonant type electrode has high efficiency and a strong electric field of a signal at a resonant frequency, and is strongly coupled (crosstalk of signals) with a peripheral conductive substance. The phase of the control signal is disturbed, and thereby a desired optical modulation cannot be obtained, when signals of both the control electrodes are in a crosstalk state.

Particularly, a signal tends to be coupled with an element (component) which satisfies a resonance condition with respect to the same frequency. In relation to the dual-electrode type MZ optical modulator, electrodes having the same basic structure are used in the control electrodes corresponding to the respective branched waveguides. For this reason, in a case of forming resonant type electrodes, both of the respective control electrodes (resonant type electrodes) have a resonant frequency of the same frequency and thus the coupling (crosstalk of signals) becomes remarkable. In addition, in a case of using a long electrode in which velocity matching is made, since the electrode is long, influence of the coupling between both electrodes becomes more remarkable.

In relation to a method of preventing crosstalk of control signals between a plurality of electrodes in a case of an optical modulator which is manufactured by forming coplanar electrodes on a substrate made of lithium niobate having an electro-optic effect, there is an example in which a groove is formed as in PTL 1. Generally, the intensity of a control electric field becomes smaller according to an increase in the distance from the control electrode. This is a phenomenon depending on even a structure of a substrate or an electrode; however, there is a disclosure that, as shown in FIG. 1, the strength of an electric field applied to the other optical waveguide is about 1% in a case where a gap between the waveguides is about 150 μm, about 0.2% in a case of about 300 μm, and about 0.1% in a case of about 400 μm.

As such, the wide gap between the two branched optical waveguides of the MZ interferometer is disadvantageous in terms of the size of a device or costs. In addition, in relation to the technique for forming a groove, shown in PTL 1, some improvement is expected to some extent, but there are some disadvantages in terms of manufacturing costs of the device since an additional structure for prevention is processed, or the like.

On the other hand, in a case where control signals of two systems are required to be fed with the same phase and the same magnitude as in the dual-electrode type MZ optical modulator, it is necessary to use a differential driver and an external phase shifter for driving the light control element and thus the entire device becomes high cost.

CITATION LIST

Patent Literature

[PTL 1] Japanese Laid-open Patent Publication No. 2009-53444

Non Patent Literature

[NPL 1] Mark Yu and Anand Gopinath, "Velocity Matched Resonant Slow-Wave Structure for Optical Modulator", Proceedings of Integrated Photonics Research (IPR), ITuH7-1, pp. 365 to 369, Palm Springs, Calif., Mar. 22, 1993

[NPL 2] Roger Krahenbuhl and M. M. Howerton, "Investigations on Short-Path-Length High-Speed Optical Modulators in LiNb0$_3$ With Resonant-Type Electrodes", JOURNAL OF LIGHTWAVE TECHNOLOGY, VOL. 19, No. 9, pp. 1287 to 1297, SEPTEMBER 2001

SUMMARY OF INVENTION

Technical Problem

An object of the present invention is to solve the above-described problems and provide a light control element which can be stably operated at a low driving voltage, and particularly, to provide a light control element which can be stably operated using two resonant type electrodes even if crosstalk (coupling) arises between both the electrodes. In addition, another object of the present invention is to provide a light control element which can reduce costs by using low-cost driving system components.

Solution to Problem

In order to solve the above-described problems, the present invention has the following technical features.

(1) A light control element including a substrate having an electro-optic effect; a plurality of optical waveguides that are formed on the substrate; and a control electrode that is formed on the substrate and controls the phase of light propagating through the optical waveguides, wherein the control electrode includes at least two resonant type electrodes having the same resonant frequency; and feeding electrodes that feed a control signal to each of the resonant type electrodes, wherein a shape and a formation position of each resonant type electrode, and a feeding point to each of the resonant type electrodes by the feeding electrode are set to allow odd mode coupling with each other, and wherein control signals having the same phase or a predetermined phase difference are fed to the respective resonant type electrodes by the feeding electrodes.

(2) The light control element set forth in (1), wherein the feeding electrodes have a plurality of branched wiring sections branched from a single input wiring section, and control signals are fed to the respective resonant type electrodes by the branched wiring sections.

(3) The light control element set forth in (1) or (2), wherein the optical waveguides form a single or a plurality of Mach-Zehnder interferometers, and the two resonant type electrodes are disposed corresponding to two optical waveguides forming the Mach-Zehnder interferometer.

(4) The light control element set forth in (3), wherein shapes and formation positions of the two resonant type electrodes and feeding points to the respective resonant type electrodes by the feeding electrodes are set to be in point symmetry with each other.

(5) The light control element set forth in any one of (1) to (4), wherein each of the resonant type electrodes includes a single signal electrode and a ground electrode surrounding the signal electrode, and wherein two ends of the signal electrode are in any one state of both of the two being opened from, both of the two being short-circuited to, and one end being short-circuited to and the other end being opened from the ground electrode.

(6) The light control element set forth in any one of (1) to (5), wherein the predetermined phase difference is an integer multiple of $2\pi$ with respect to a control signal having a predetermined frequency.

(7) The light control element set forth in (2), wherein an impedance of the feeding electrode in each branched wiring section and an impedance at the feeding point of each resonant type electrode are set to be substantially twice an impedance of the feeding electrode in the input wiring section.

(8) The light control element set forth in any one of (1) to (7), wherein each of the resonant type electrodes has a single signal electrode, and a length of the signal electrode is longer than a wavelength of the control signal having a predetermined frequency on the signal electrode.

(9) The light control element set forth in any one of (1) to (8), wherein each of the resonant type electrodes has a single signal electrode, and a feeding point to the signal electrode is a point where an impedance of the resonant type electrode matches an impedance of the feeding electrode connected to the feeding point.

(10) The light control element according to any one of (1) to (9), wherein the feeding point is set to a position closest to a center of the resonant type electrode.

Advantageous Effects of Invention

As set forth in (1), according to the present invention, a light control element includes a substrate having an electro-optic effect; a plurality of optical waveguides that are formed on the substrate; and a control electrode that is formed on the substrate and controls the phase of light propagating through the optical waveguides. The control electrode includes at least two resonant type electrodes having the same resonant frequency; and feeding electrodes that feed a control signal to each of the resonant type electrodes. In addition, a shape and a formation position of each resonant type electrode, and a feeding point to each of the resonant type electrodes by the feeding electrode are set to allow odd mode coupling with each other, and control signals having the same phase or a predetermined phase difference are fed to the respective resonant type electrodes by the feeding electrodes.

Therefore, even if crosstalk (coupling) arises between the resonant type electrodes, since the same amount of electric field energy, as an extent of coupling with the other electrode, is received in the same phase, the electrodes work in the same manner as in a case where there is no coupling, and thus a stable optical modulation operation is possible. In addition, this is the same regardless of the strength of the coupling between both the electrodes. Accordingly, it is possible to provide a light control element which can be stably operated at a low driving voltage.

As set forth in (2), according to the present invention, the feeding electrodes have a plurality of branched wiring sections branched from a single input wiring section, and control signals are fed to the respective resonant type electrodes by the branched wiring sections.

Therefore, a control signal having a predetermined phase difference (including the same phase) and also having the same magnitude can be very simply formed, and thus a high-priced device such as a differential driver or an external phase shifter need not to be used. As a result, it is possible to provide a light control element capable of achieving low costs.

As set forth in (3), according to the present invention, the optical waveguides form a single or a plurality of Mach-Zehnder interferometers, and the two resonant type electrodes are disposed corresponding to two branched optical waveguides forming the Mach-Zehnder interferometer.

Therefore, it is possible to provide a light control element which is operated at a lower driving voltage, such as a dual-electrode type optical modulator using the resonant type electrode.

As set forth in (4), according to the present invention, shapes and formation positions of the two resonant type electrodes and feeding points to the respective resonant type electrodes by the feeding electrodes are set to be in point symmetry with each other.

Therefore, even if crosstalk (coupling) arises between the resonant type electrodes, since electric field energy is sent and received in the same phase state at all times, a stable operation is possible in the same manner as in a case where there is no coupling.

As set forth in (5), according to the present invention, each of the resonant type electrodes includes a single signal electrode and a ground electrode surrounding the signal electrode, and two ends of the signal electrode are in any one state of both of the two being opened from, both of the two being short-circuited to, and one end being short-circuited to and the other end being opened from the ground electrode.

Therefore, it is possible to form resonant type electrodes with various wavelengths even if a signal electrode with the same length is used. In addition, in a case where both of the two ends of the signal electrode are opened or short-circuited, the ends of the signal electrodes of the respective resonant type electrodes are aligned with each other and are disposed in parallel. For this reason, the entire length when two resonant type electrodes are disposed so as to be arranged can be made to be the minimum. Further, in a case where the electrodes are used in a Mach-Zehnder interferometer, positions of interaction regions where the signal electrodes apply electric fields to the respective branched waveguides are in line symmetry with respect to an optical axis which is arranged in a propagation direction of light waves in the Mach-Zehnder interferometer, and thus it is possible to implement a light control element which makes the wavelength chirp zero.

As set forth in (6), according to the present invention, the predetermined phase difference is an integer multiple of $2\pi$ with respect to a control signal having a predetermined frequency.

Therefore, it is possible to easily realize the same operation as in a case where a control signal with the same phase is fed to the resonant type electrode.

As set forth in (7), according to the present invention, an impedance of the feeding electrode in each branched wiring section and an impedance at the feeding point of each resonant type electrode are set to be substantially twice as much as an impedance of the feeding electrode in the input wiring section.

Therefore, reflection of a control signal supplied to the input wiring section toward the branched wiring section or the resonant type electrode due to impedance mismatching or the like is suppressed, thus modulation efficiency by the control signal is increased, and thereby it is possible to realize a still lower diving voltage.

As set forth in (8), according to the present invention, each of the resonant type electrodes has a single signal electrode, and a length of the signal electrode is longer than a wavelength of the control signal having a predetermined frequency on the signal electrode.

Therefore, it is possible to provide a light control element which can be operated at a lower driving voltage.

As set forth in (9), according to the present invention, each of the resonant type electrodes has a single signal electrode, and a feeding point to the signal electrode is a point where an impedance of the resonant type electrode matches an impedance of the feeding electrode connected to the feeding point.

Therefore, when a control signal is input to the signal electrode, reflection due to impedance mismatching or the like is suppressed, and thus it is possible to provide a light control element at a low driving voltage.

As set forth in (10), according to the present invention, the feeding point is set to a position closest to the center of the resonant type electrode.

Therefore, characteristic differences based on manufacturing errors of the electrodes are suppressed, and distributions of electric field intensities which the respective resonant type electrodes exert on the optical waveguides can be made to be approximately the same. As a result, it is possible to suppress wavelength chirp.

DESCRIPTION OF EMBODIMENTS

Hereinafter, a light control element of the present invention will be described in detail.

Figure 1:
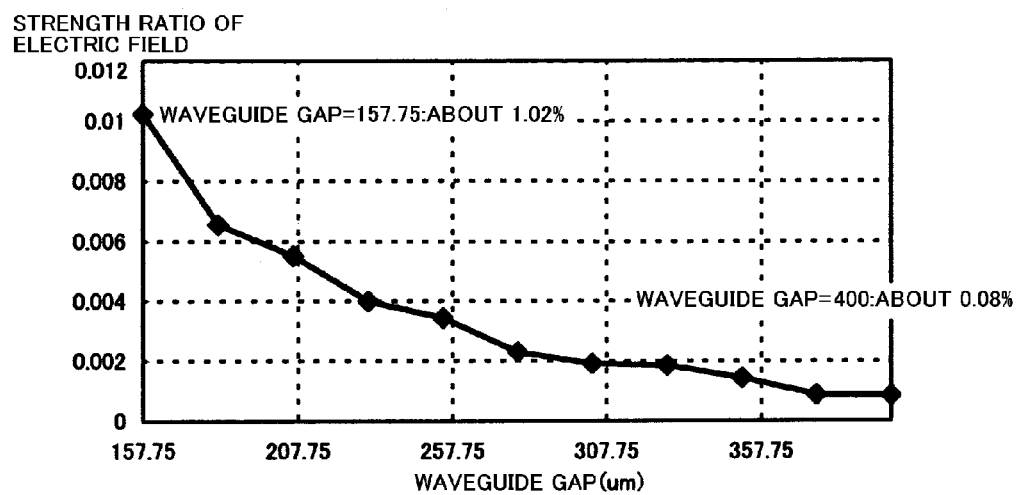
FIG. 1 is a graph illustrating a relationship between the strength of an electric field and a distance (a gap between optical waveguides), disclosed in PTL 1.
Figure 2:
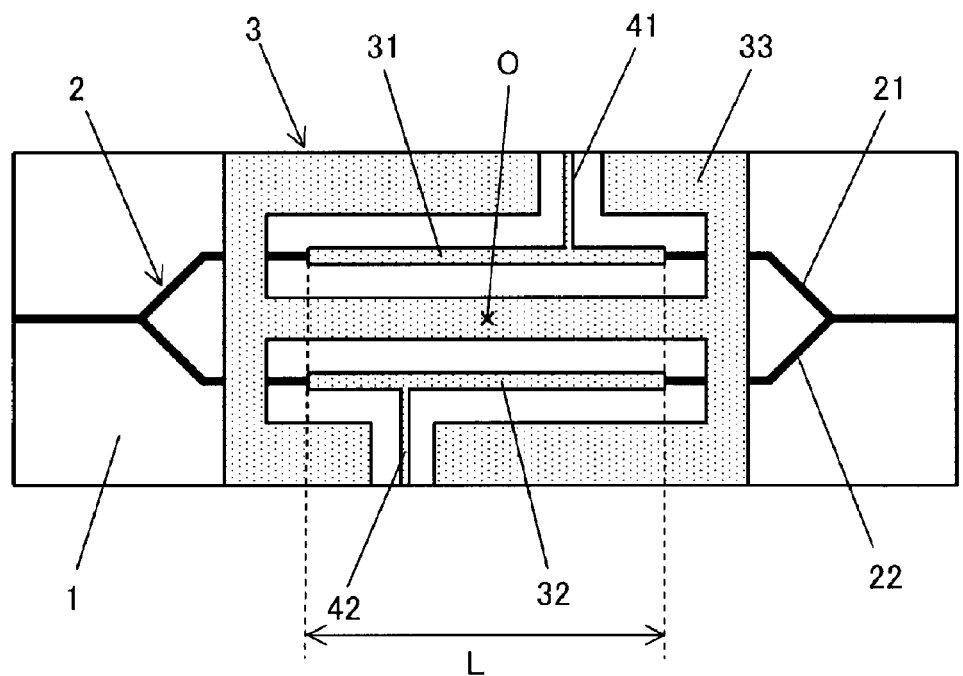
FIG. 2 is a diagram illustrating a first embodiment (both ends of a signal electrode are opened from a ground electrode) related to a light control element of the present invention.
Figure 5:
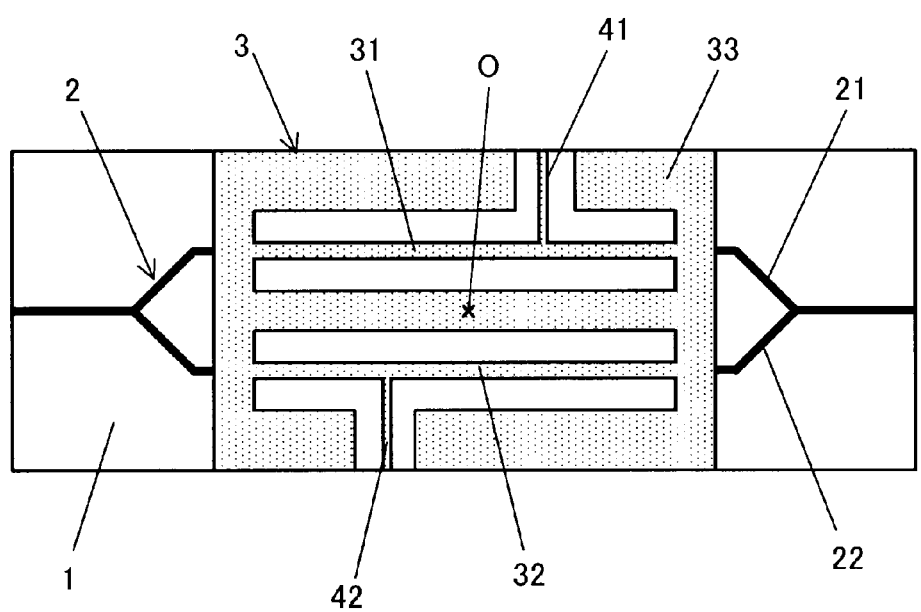
FIG. 5 is a diagram illustrating a second embodiment (both ends of a signal electrode are short-circuited to the ground electrode) related to the light control element of the present invention.

A light control element of the present invention includes, as shown in FIG. 2 or 5, a substrate 1 having an electro-optic effect, a plurality of optical waveguides 2 formed on the substrate, and a control electrode 3 which is formed on the substrate and controls the phase of light propagating through the optical waveguides. The control electrode includes at least resonant type electrodes 31 and 32 having the same resonant frequency and feeding electrodes 41 and 42 which feed a control signal to the respective resonant type electrodes. A shape and a formation position of each resonant type electrode, and a feeding point to each of the resonant type electrodes by the feeding electrode are set to allow odd mode coupling with each other. The control signals having the same phase or a predetermined phase difference are fed to the respective resonant type electrodes by the feeding electrodes.

Examples of the substrate 1 having an electro-optic effect which can be used include lithium niobate, lithium tantalate, polarized lead zirconium titanate (PLZT), quartz-based materials, and combinations thereof.

Particularly, lithium niobate (LN) or lithium tantalate (LT) crystals having a high electro-optic effect are preferably used.

The optical waveguide can be formed using a method in which a ridge structure is formed on the substrate, a method in which the refractive index of a part of the substrate is adjusted, or a method in which both of the methods are combined. In a ridge-type optical waveguide, the substrate is mechanically cut or chemically etched so as to leave substrate portions which become the optical waveguide and remove the other portions. In addition, it is also possible to form grooves on both sides of the optical waveguide. In a method in which the refractive index is adjusted, the substrate is configured to have a refractive index higher than the refractive index of the substrate itself at a part of the substrate surface which corresponds to the optical waveguide by thermally diffusing Ti or the like, or using a proton-exchange method or the like.

The control electrode such as a signal electrode or a ground electrode can be formed by forming an electrode pattern of Ti.Au, by using a gold plating method, and the like. In addition, as necessary, the respective electrodes are disposed with a buffer layer such as a $SiO_2$ film interposed between the electrodes and the substrate. The buffer layer has an effect of preventing light waves which propagate through the optical waveguide from being absorbed or scattered by the control electrode. In addition, it is also possible for the buffer layer to further include a Si film or the like, as necessary, in order to alleviate the pyroelectric effect of a thin plate.

The light control element of the present invention has a configuration in which at least two resonant type electrodes are formed in the control electrode, and there is no influence on modulation efficiency of a control signal (modulation signal) even if both the resonant type electrodes are in crosstalk. For this reason, the following two requirements are necessary.

(1) Both of the resonant type electrodes have basically the same shape and are coupled with each other in an odd (symmetry) mode.

(2) Signals having the same phase are fed to both of the resonant type electrodes.

The resonant type electrode mainly includes a single signal electrode and a ground electrode surrounding the signal electrode. In addition, as combinations of the two resonant type electrodes, as described later, a combination of "both-end open and both-end open" in which both ends of each signal electrode are opened from the ground electrode, or "both-end short-circuited and both-end short-circuited" in which both ends of each signal electrode are short-circuited to the ground electrode, is one of the preferable forms; however, needless to say, the light control element of the present invention is not limited thereto, and various combinations are possible such as "both-end open and both-end short-circuited", "both-end open, and one end short-circuited and the other end open", or "both-end short-circuited, and one end short-circuited and the other end open".

The two resonant type electrodes are formed of electrodes having basically the same shape, and thus have the same resonant frequency and satisfy a condition of being easily coupled with each other. Typically, if these electrodes are disposed so as to be symmetric with respect to a central axis (light propagation direction) of the MZ interferometer, since an electric field generated by a control signal supplied to the signal electrode and an electric field generated by crosstalk from the electric field formed by the other resonant type electrode have different electric field states (directions of electric field vectors) depending on positions on a single signal electrode forming the resonant type electrode, the control signals complicatedly interfere with each other, and thus normal propagation of the control signal on the resonant type electrode (particularly, a single signal electrode) is obstructed.

On the other hand, in a case where both the resonant type electrodes are disposed under a condition in which odd mode coupling is allowed therebetween even if they are coupled, and signals with the same magnitude are fed in the same phase, the same amount of electric field energy as an extent of coupling with the other electrode is received in the same phase, and thus the electrodes work in the same manner as in a case where there is no coupling. This is the same regardless of the strength of the coupling between both the electrodes.

In order to dispose both the resonant type electrodes so as to satisfy the condition in which odd mode coupling is allowed therebetween even if they are coupled, a configuration as shown in FIG. 2 is used. That is to say, the resonant type electrodes have the same shape, and are disposed at positions where the electrodes are in 180° rotation symmetry (point symmetry; refer to the fixed point O in FIG. 2) with respect to any point as a rotation center which is located on the plane at the same distance from interaction regions (portions where electric fields formed by the respective resonant type electrodes act on the optical waveguides) of the MZ interferometer. Each of the control signals with the same phase and the same magnitude is fed to a feeding point of a single signal electrode (31 or 32) of the resonant type electrode using the feeding electrode 41 or 42.

Figure 6:
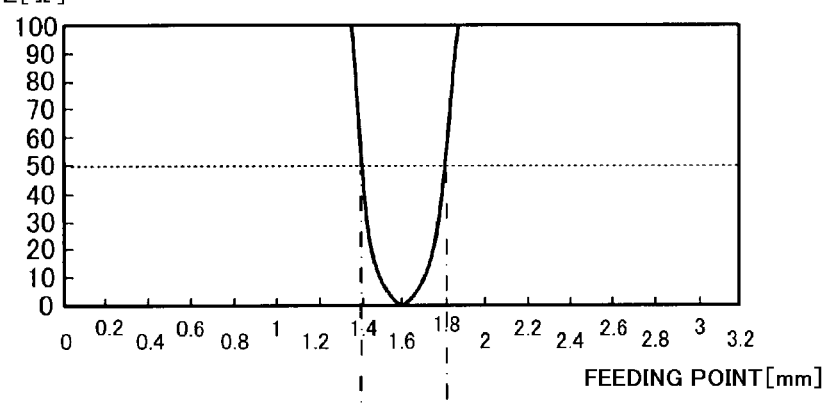
FIG. 6 is a diagram illustrating a relationship between a feeding point and an impedance, and a state of an electric field vector at a specific timing in a case where the length of the signal electrode in the light control element of FIGS. 2 and 20 is a half wavelength $\lambda/2$ (where $\lambda$ is a signal wavelength).
Figure 6:
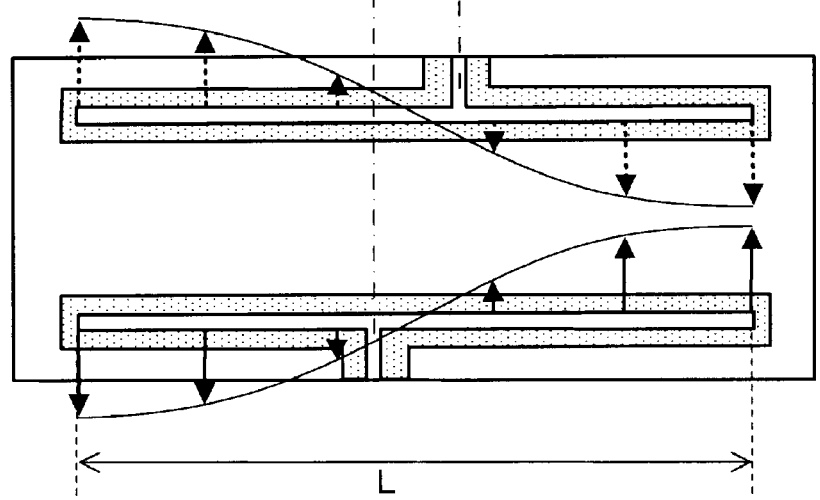

FIG. 6 is a diagram illustrating a relationship between a feeding point and an impedance, and a state of an electric field vector (arrow) at a specific timing in a case where the length L of the resonant type electrode (signal electrode) in the light control element of FIG. 2 is a half wavelength $\lambda/2$ (where $\lambda$ is a signal wavelength). As is clear from the graph of FIG. 6 showing a relationship between the feeding point and the impedance, there are two feeding points where the impedance is 50Ω when the length of the signal electrode corresponds to a half wavelength of the signal wavelength in a case where both ends of each of the signal electrodes (resonant type electrodes) 31 and 32 are opened from the ground electrode 33.

In addition, in a case where feeding points are different even if the control signals with the same phase are input, the electric field vectors at the specific timing face in opposite directions like the electric field vectors shown in the upper resonant type electrode and the lower resonant type electrode of FIG. 6.

Figure 7:
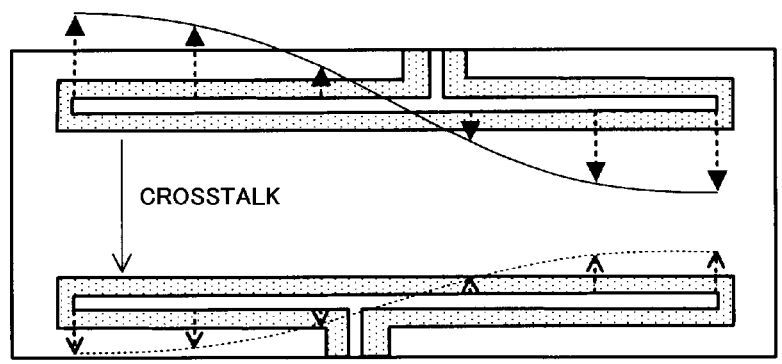
FIG. 7 is a diagram illustrating a state where a crosstalk arises in the lower resonant type electrode which is a little apart from the upper resonant type electrode when a control signal is applied to only the upper resonant type electrode in the same case as in FIG. 6.
Figure 8:
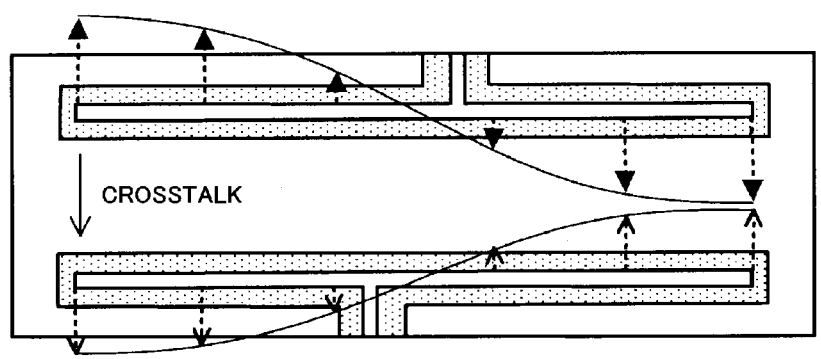
FIG. 8 is a diagram illustrating a state where a crosstalk arises when the upper resonant type electrode and the lower resonant type electrode are close to each other in the same case as in FIG. 7.

FIGS. 7 and 8 are diagrams illustrating a circumstance in which electric field vectors are formed when a control signal is fed only to the upper resonant type electrode, and the electric field vectors formed in the lower resonant type electrode are caused by crosstalk (coupling) from the upper resonant type electrode. As such, in the crosstalk, a signal (electric field vector) of which a phase is shifted by $\pi$ is excited. The magnitude of the excited electric field vector becomes larger in a case where a gap between the two resonant type electrodes is small (FIG. 8).

Figure 9:
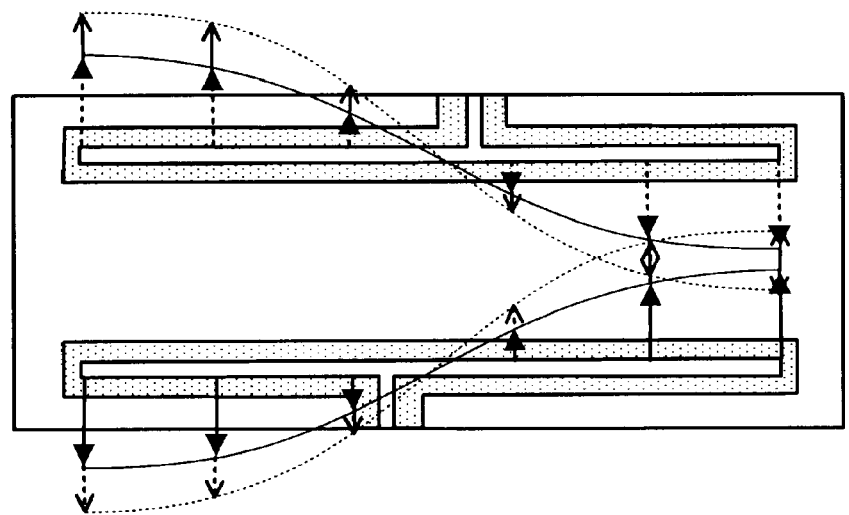
FIG. 9 is a diagram illustrating a state where a crosstalk arises in the other resonant type electrode which is a little apart from one resonant type electrode when a control signal is applied to the respective resonant type electrodes in the same case as in FIG. 6.
Figure 10:
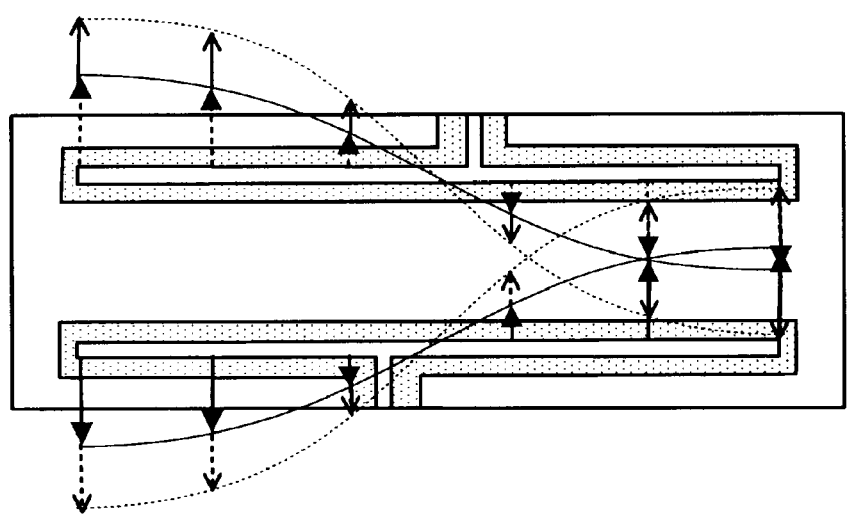
FIG. 10 is a diagram illustrating a state where a crosstalk arises when the upper resonant type electrode and the lower resonant type electrode are close to each other in the same case as in FIG. 9.

Here, when the electric field vectors generated in each resonant type electrode by supplying the control signals as in FIG. 6 and the electric field vectors (crosstalk) excited in the other resonant type electrode by one resonant type electrode overlap each other as FIG. 7 or 8 and are observed, since an odd (symmetry) mode appears even if crosstalk (coupling) arises between both the resonant type electrodes as shown in FIG. 9 or 10, the control signal (the electric field vector through the feeding) on each electrode is not disturbed but desired optical modulation can be performed. Naturally, influence of the crosstalk becomes remarkable in a case where a gap between the resonant type electrodes is small as in FIG. 10; however, the electric field generated through the feeding and the electric field excited by the crosstalk face in the same direction, and thus disturbance of modulation due to the crosstalk does not arise.

Figure 11:
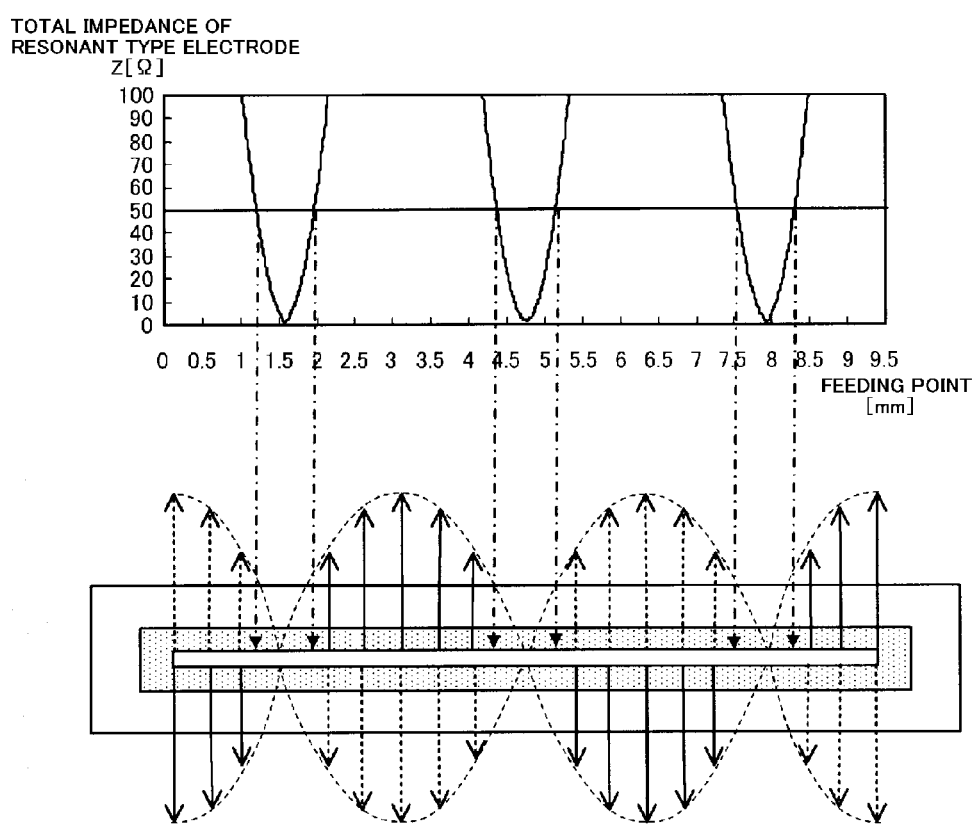
FIG. 11 is a diagram illustrating a relationship between a feeding point and an impedance, and a state of an electric field vector at a specific timing in a case where the length of the signal electrode (both ends of the signal electrode are opened from the ground electrode) of the resonant type electrode is $3\lambda/2$ (where $\lambda$ is a signal wavelength).

As shown in FIG. 11, in a resonant type electrode where an electrode length of the signal electrode (resonant type electrode) 31 or 32 is longer than the wavelength of the control signal, there are a plurality of excitation points (feeding points) which have a specific an impedance value and also perform the same resonance operation. Therefore, any excitation point may be used as a feeding point as long as the point excites resonance of the same condition. However, the respective feeding points in the two resonant type electrodes being close to each other is more preferable since distributions of intensities of the electric fields formed by the respective resonant type electrodes in the propagation direction of the optical waveguides are approximately the same, for example, in a case of the MZ interferometer, wavelength chirp can be made to be zero.

Figure 3:
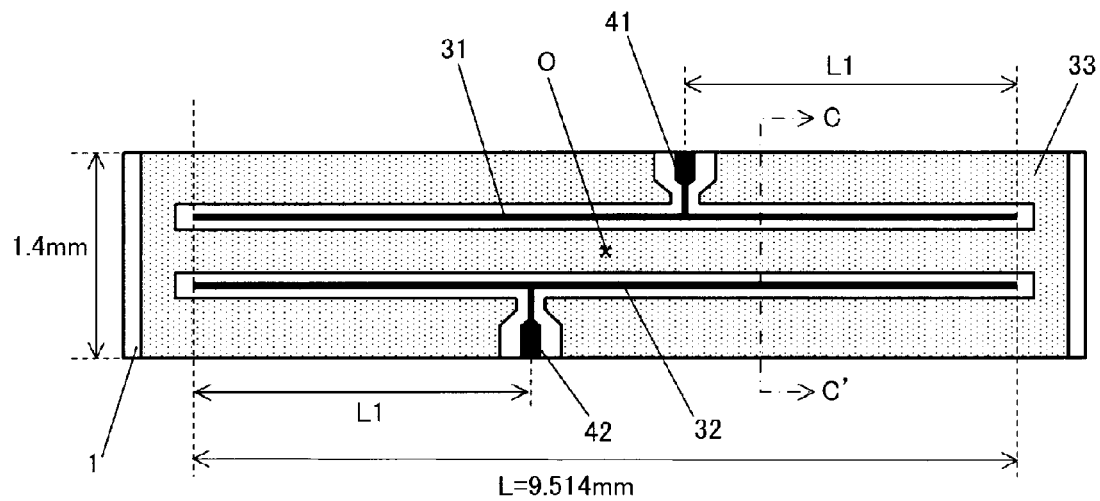
FIG. 3 is a diagram illustrating an outline of electrodes of the light control element of FIG. 2.

FIG. 3 briefly shows a configuration of a practical electrode used for the light control element of the present invention. Since the light control element has a dual-electrode structure, a Z-cut type LN substrate is the most suitable as a substrate. The optical waveguide has a shape of the MZ interferometer type. In the related art, in order to reduce the influence of interference between control signals, it is necessary to increase a gap between the branched optical waveguides such that a gap between the signal electrodes (between hot electrodes) becomes 400 μm or more; however, there is no such necessity in the light control element of the present invention. On the contrary, since the light control element itself can be miniaturized by making the waveguide gap small, the gap may be equal to or less than 100 μm in which crosstalk (coupling) is remarkable in a resonant type modulation in the related art.

A shape of the resonant type electrode has a coplanar (CPW) structure (a configuration in which a signal electrode is interposed between ground electrodes) such that the velocity of a light signal propagating through the optical waveguide is approximately the same as the velocity of the control signal propagating through the electrode. In a case where the propagation velocities of the two are approximately the same (a velocity matching condition is nearly satisfied), the length of the signal electrode (resonant type electrode) can be made to be larger than the wavelength of a resonant frequency of the control signal, which is thus advantageous in reducing a driving voltage.

In addition, the resonant type electrode is not limited to the above-described CPW structure, and may use various configurations such as CPS (a configuration in which a ground electrode is provided on one side of a signal electrode) or G-CPW (a configuration in which CPW is formed on a front surface of a substrate and a ground electrode is provided on a rear surface of the substrate). The feeding electrode may use various configurations in the same manner as the resonant type electrode, and preferably use the same kind of configuration in order to facilitate electrical connection between the feeding electrode and the resonant type electrode. In addition, in the feeding electrode, a capacitor or a resistor may be provided in the middle of the feeding electrode, and a filter circuit or the like may also be disposed as necessary.

Figure 4:
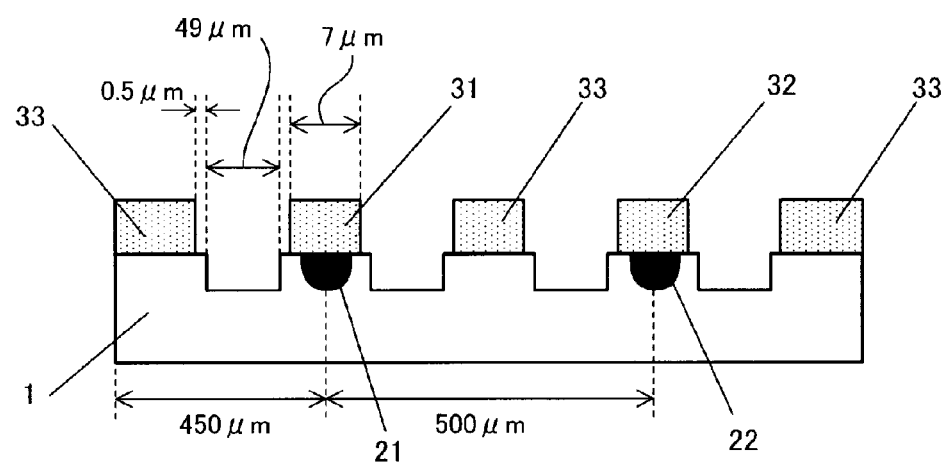
FIG. 4 is a diagram illustrating a cross-sectional structure of the light control element of FIG. 3.

In the light control element of the present invention, as shown in FIG. 4 (a cross-sectional view taken along the dotted lines C-C' of FIG. 3), a ridge type optical waveguide in which a control signal is effectively applied to the optical waveguide portion is used in order to further reduce a driving voltage. Naturally, the optical waveguide is formed on the substrate in a ridge shape, and a refractive index may also be adjusted by thermally diffusing Ti onto the ridge portion as necessary. In addition, even in an electrode with a non-CPW structure, or even in a non-ridge type waveguide, any electrode type or optical waveguide may be used in a configuration in which velocity matching is substantially satisfied.

In FIG. 2 or 3, each of the signal electrodes (resonant type electrodes) 31 and 32 uses a signal electrode type of which both ends are opened from the ground electrode. The feeding point is provided not at the center of the signal electrode (resonant type electrode) but at an asymmetrical position. Here, a feeding point uses a point closest to the center of the signal electrode (resonant type electrode) where an impedance is 50Ω (typically 50Ω; however, an impedance value is not necessarily limited to this value) on the signal electrode (resonant type electrode), and a control signal is directly fed without using an impedance matching circuit as a driving circuit. This is because characteristic deviations that are caused by a change of shapes or the like of ends of the electrode due to a problem in reproducibility of manufacturing processes are smaller in a case where a signal is fed to a point that is closest to the center of the signal electrode compared with in a case where a signal is fed to edges of the electrode.

Next, FIG. 5 shows a second embodiment of the light control element of the present invention. A difference from the embodiment shown in FIG. 2 is that both ends of the signal electrode (resonant type electrode) are opened from the ground electrode in the embodiment shown in FIG. 2, whereas both the ends are short-circuited to the ground electrode in FIG. 5.

In the embodiment shown in FIG. 5 as well, in the same manner as in FIG. 2, under the condition in which both the resonant type electrodes have the same shape and are disposed at positions where the electrodes form 180° rotation symmetry (point symmetry) with respect to a rotation center of the MZ interferometer, and control signals with the same magnitude are fed thereto in the same phase, electric fields at the positions of the respective signal electrodes (resonant type electrode) 31 and 32 are electric fields with the same magnitude and reverse signs. For this reason, if the electrode disposition condition as in FIG. 5 or the feeding condition of the control signals is satisfied, since an odd (symmetry) mode arrives even if coupling arises between both the resonant type electrodes, the control signal on each signal electrode (resonant type electrode) is not disturbed.

Figure 12:
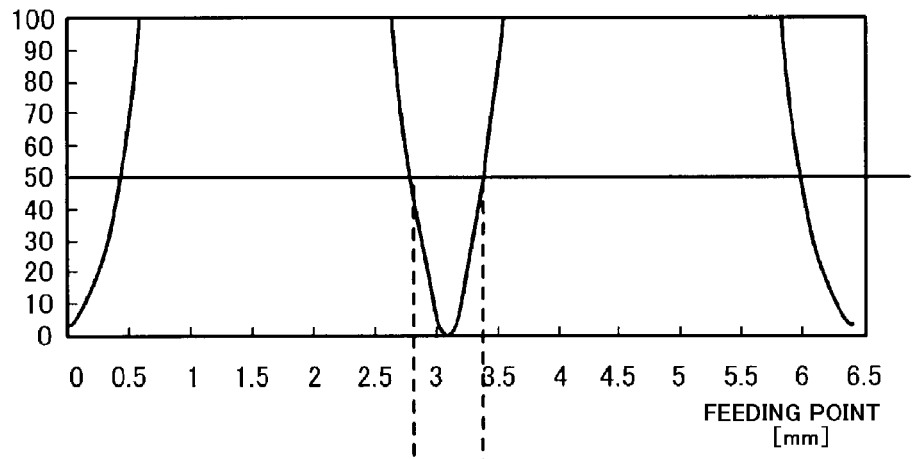
FIG. 12 is a diagram illustrating a relationship between a feeding point and an impedance, and a state of an electric field vector at a specific timing in a case where the length of the signal electrode in the light control element of FIG. 5 is $\lambda$ (where $\lambda$ is a signal wavelength).
Figure 12:
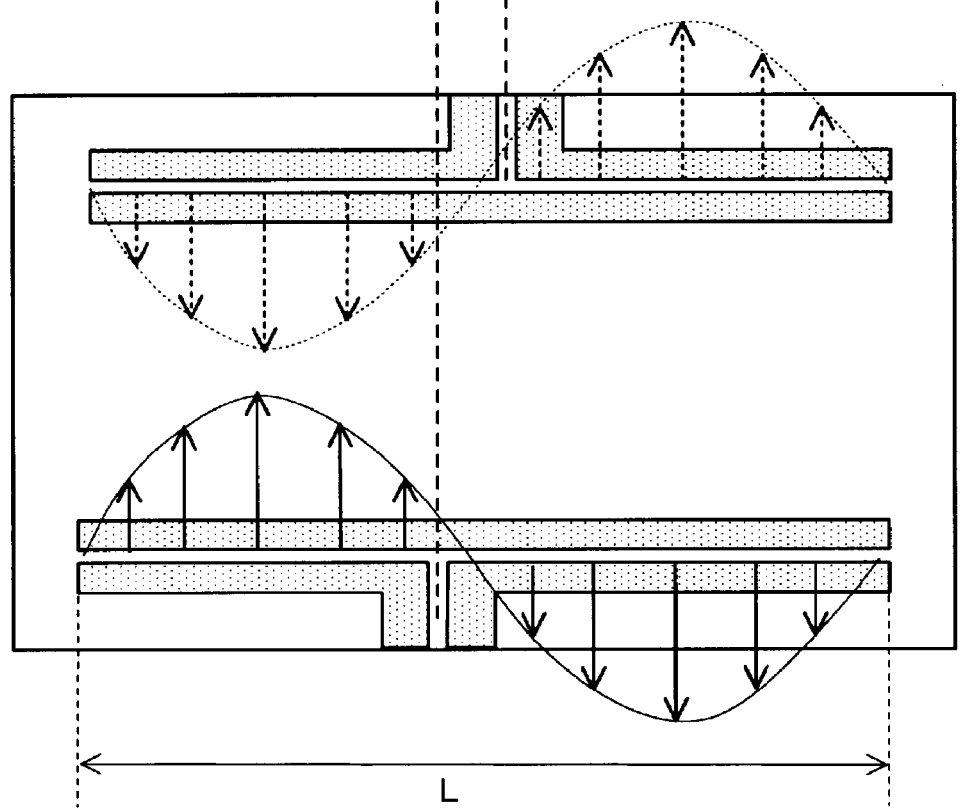

FIG. 12 is a diagram illustrating a relationship between a feeding point and an impedance, and a state of an electric field vector at a specific timing in a case where the length L of the resonant type electrode in the light control element of FIG. 5 is λ (where λ is a signal wavelength). As is clear from the graph of FIG. 12 showing a relationship between the feeding point and the impedance, there are four feeding points where the impedance is 50Ω when the length L of the signal electrode corresponds to one wavelength of the signal wavelength in a case where both ends of each of the signal electrodes (resonant type electrodes) 31 and 32 are opened from the ground electrode 33.

In addition, in a case where feeding points have a relationship (point symmetry) as shown in FIG. 12 even if the control signals with the same phase are input, the electric field vectors at the specific timing face in opposite directions like the electric field vectors shown in the upper resonant type electrode and the lower resonant type electrode of FIG. 12. In addition, as feeding points, feeding points which are mutually close to end portions of the signal electrode (resonant type electrode) may be selected; however, this is not preferable since characteristic deviations are large when shapes or the like of ends of the electrode are changed due to a problem in reproducibility of manufacturing processes, and electric field intensity distributions formed by the two resonant type electrodes tend to be different, and from the viewpoint of making the wavelength chirp zero.

Figure 13:
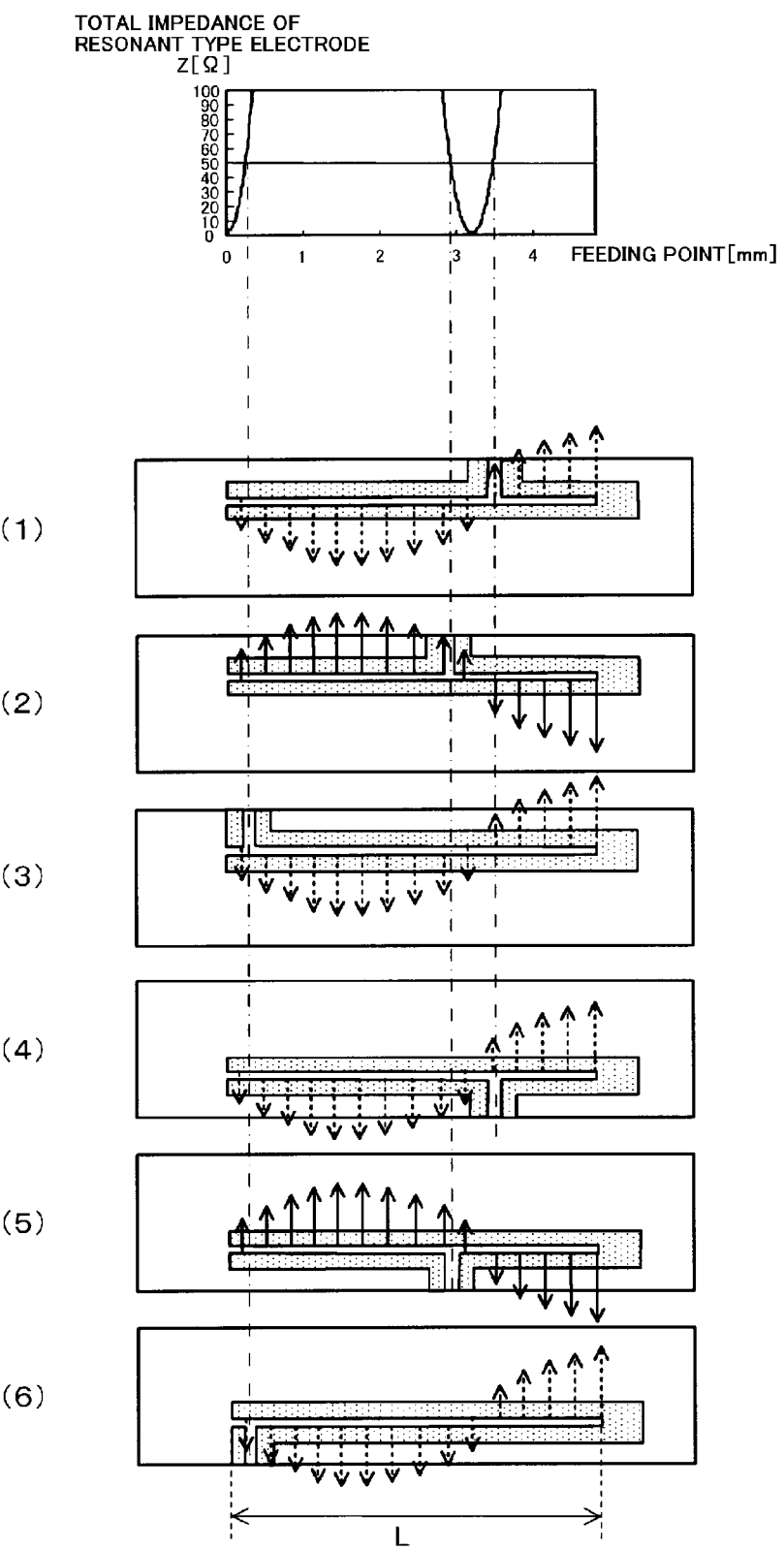
FIG. 13 is a diagram illustrating a relationship between a feeding point and an impedance, and a state of an electric field vector at a specific timing in a case where the length of the signal electrode (a left end of the signal electrode is short-circuited to and a right end thereof is opened from the ground electrode) of the resonant type electrode is 3λ/4 (where λ is a signal wavelength).
Figure 14:
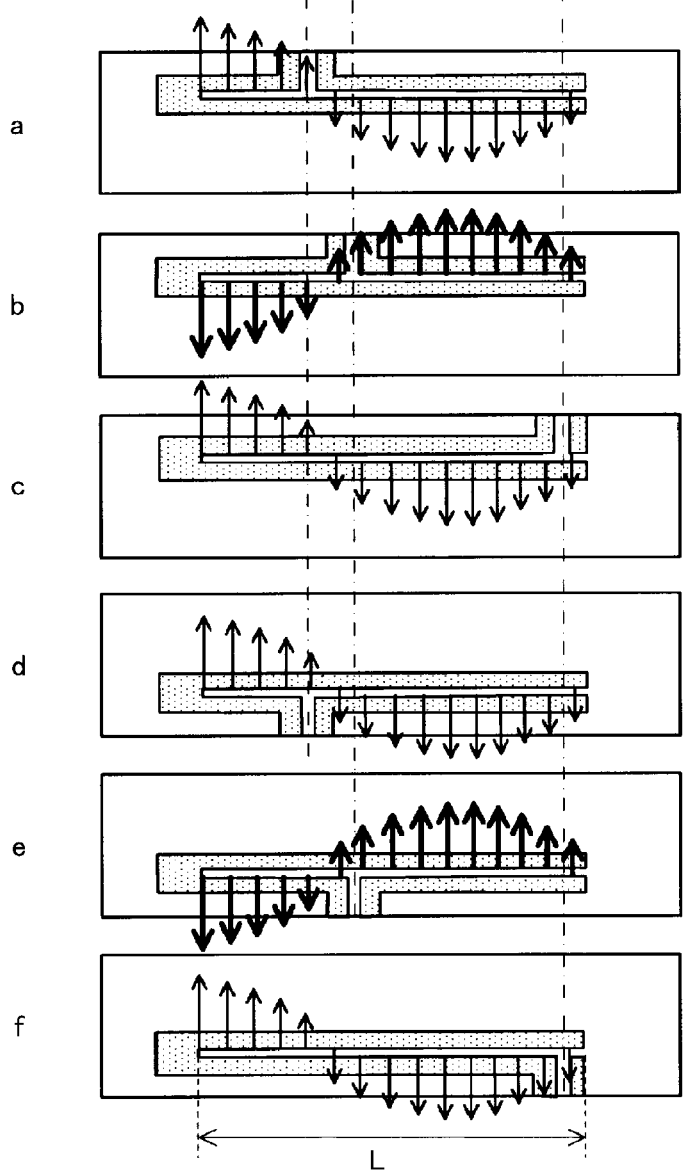
FIG. 14 is a diagram illustrating a relationship between a feeding point and an impedance, and a state of an electric field vector at a specific timing in a case where the length of the signal electrode (the left end of the signal electrode is opened from and the right end thereof is short-circuited to the ground electrode) of the resonant type electrode is 3λ/4 (where λ is a signal wavelength).

In addition, as a signal electrode forming the resonant type electrode, there is one in which one end is opened from and the other is short-circuited to the ground electrode. FIGS. 13 and 14 are diagrams illustrating a relationship between a feeding point and an impedance, and a state of an electric field vector at a specific timing in a case where the length L of the signal electrode of the resonant type electrode is 3λ/4 (where λ is a signal wavelength), particularly, FIG. 13 shows that a left end of the signal electrode is short-circuited and a right end thereof is opened from the ground electrode, and FIG. 14 shows that the left end of the signal electrode is opened from and the right end thereof is short-circuited to the ground electrode.

As shown in FIGS. 13 and 14, even in the resonant type electrode with this shape, there are three feeding points where an impedance is 50Ω. In addition, as electric field vectors generated in the resonant type electrode at a specific timing, electric field vectors in different directions may be selected depending on the feeding points.

Figure 15:
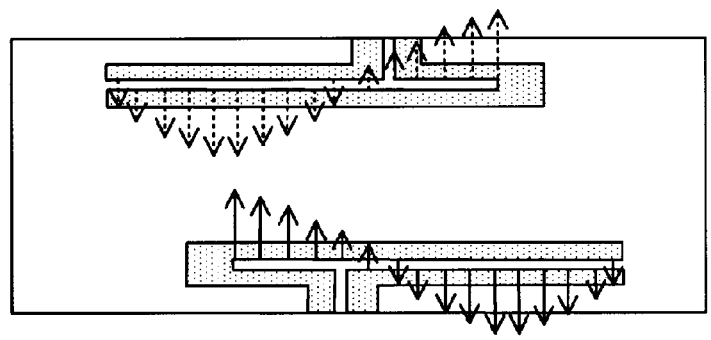
FIG. 15 is a diagram illustrating an example in which the resonant type electrodes of FIGS. 13 and 14 are combined with each other.

However, even if one of the resonant type electrodes exemplified in FIG. 13 and one of the resonant type electrodes exemplified in FIG. 14 are combined in point symmetry, it is necessary to dispose both of them so as to be shifted as shown in FIG. 15, in order to dispose the electrodes in a relationship in which odd mode coupling with each other is allowed, and the size of the light control element itself increases. In addition, it is difficult to make wavelength chirp zero since optical modulation is performed at different positions with respect to the propagation direction of light waves.

In addition, in a case where the resonant type electrodes are disposed regardless of point symmetry, odd mode coupling can be performed by combining, for example, the cases of the reference signs 1 and 5 of FIG. 13.

Figure 16:
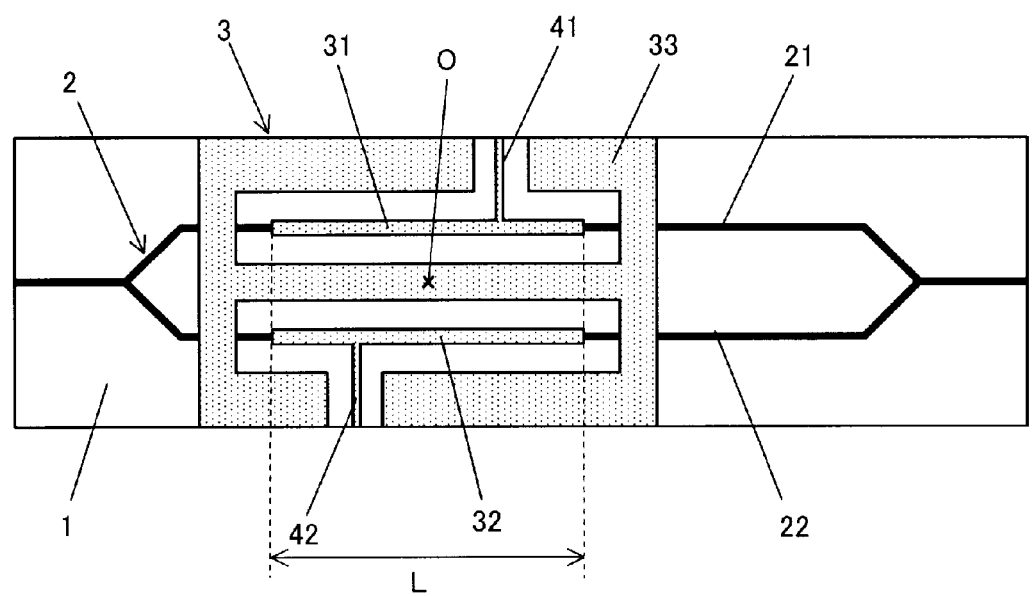
FIG. 16 is a diagram illustrating a configuration in which resonant type electrodes related to an embodiment of the present invention are unevenly disposed in a portion of the MZ interferometer.
Figure 17:
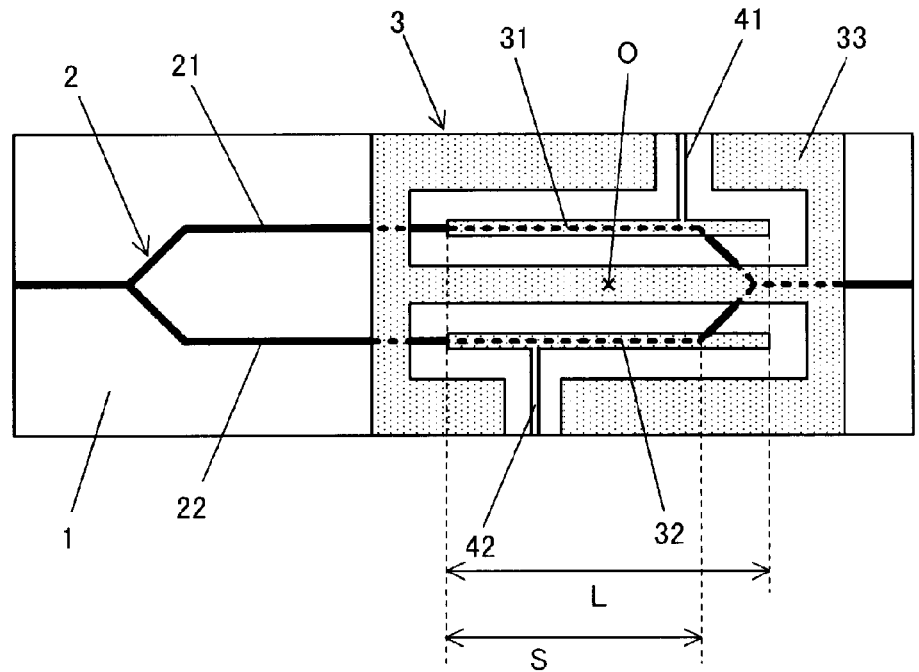
FIG. 17 is a diagram illustrating a configuration in which only a portion of the resonant type electrodes are interaction regions which act on optical waveguides.

In addition, positions of the resonant type electrodes with respect to the optical waveguides forming the MZ interferometer are not limited to disposing two resonant type electrodes so as to match the center of the MZ interferometer, and, for example, as shown in FIG. 16, there may be a configuration in which the resonant type electrodes 31 and 32 are unevenly disposed in a part of the branched waveguides of the MZ interferometer, or, as shown in FIG. 17, there may be a configuration in which only a part of the resonant type electrodes are disposed so as to overlap the branched waveguides, and thus the resonant type electrodes are disposed so as to include an interaction region (the range S) acting on the optical waveguides and a non-interaction region. In addition, in a case as in FIG. 17, a shape or a disposition of the resonant type electrodes of the non-interaction region increases in a degree of freedom as compared with a case where the entire resonant type electrode is an interaction region.

Figure 18:
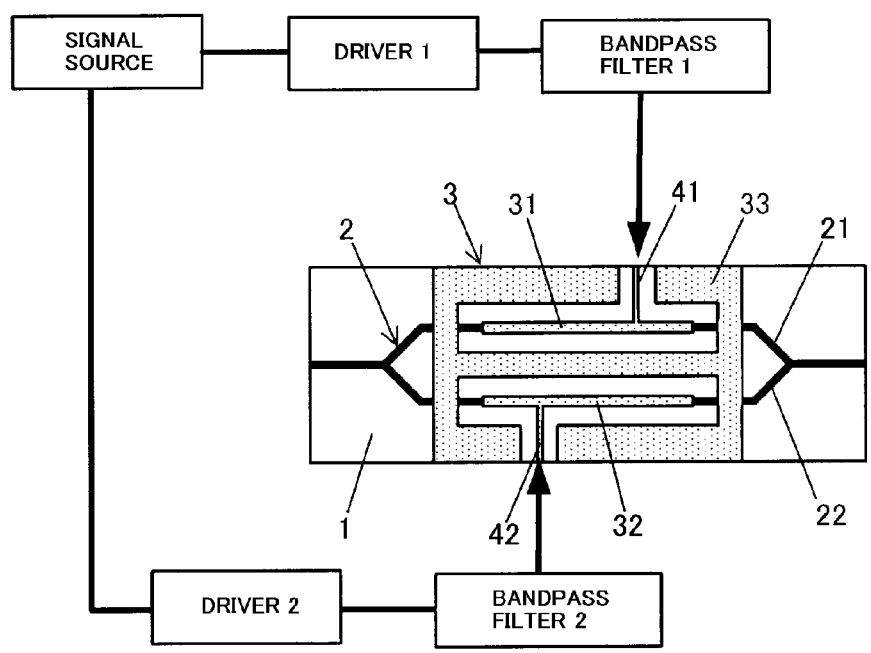
FIG. 18 is a diagram illustrating a state where a driving circuit which inputs a control signal to the light control element of the present invention is disposed.
Figure 19:
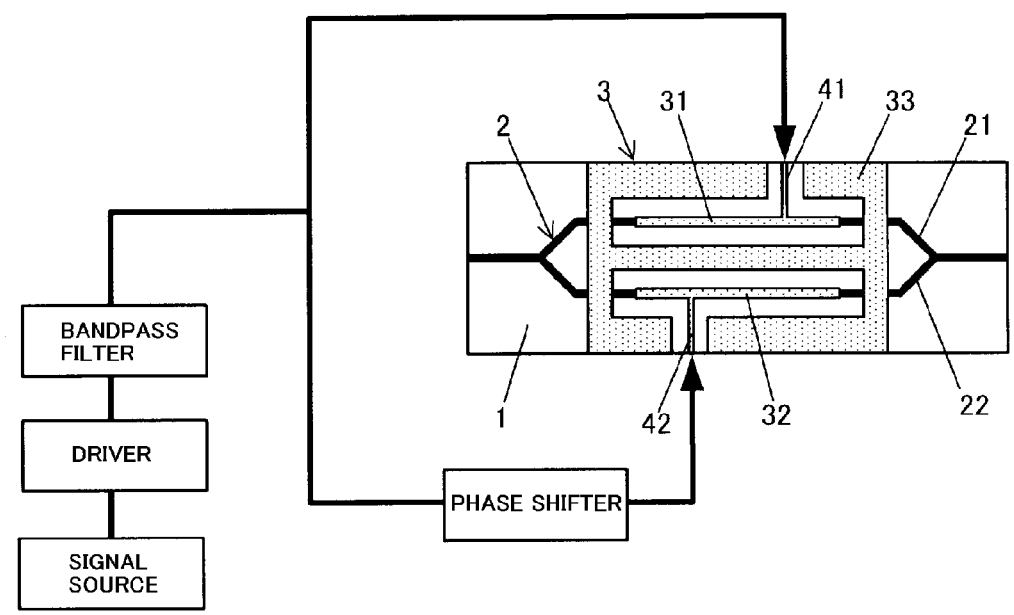
FIG. 19 is a diagram illustrating another state where a driving circuit which inputs a control signal to the light control element of the present invention is disposed.

In order to drive the light control element of the present invention, control signals with the same frequency are applied to the respective resonant type electrodes in the same phase. As shown in FIG. 18, the control signals (the arrows) are input to the feeding electrodes 41 and 42 of the respective resonant type electrodes 31 and 32 using two-system driving circuits. As an example of the driving circuit, a signal with a predetermined frequency from a signal source is input to a driver 1 (a driver 2) so as to be amplified to a predetermined signal voltage which is input to the feeding electrodes 41 and 42 of the light control element via a bandpass filter 1 (a bandpass filter 2) for removing noise. In addition, as shown in FIG. 19, a control signal may be divided into two which are supplied to the resonant type electrodes 31 and 32 using a single driving circuit. However, in this case, a phase shifter is preferably interposed in at least one feeding line path in order to adjust a phase of the fed control signal. Naturally, the length of a feeding line may be adjusted so as to be in phase in advance, and, in this case, the phase shifter may be omitted.

Figure 20:
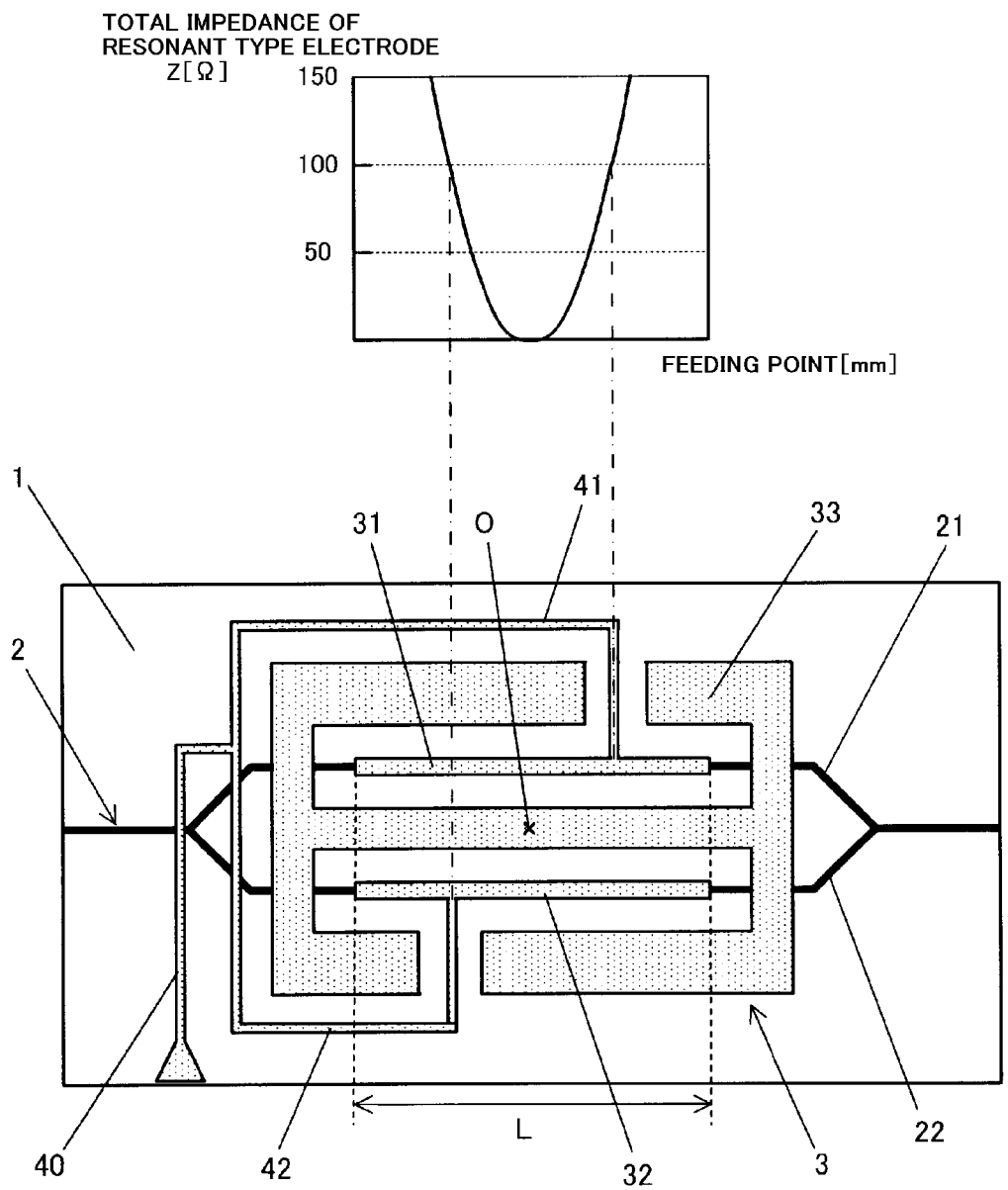
FIG. 20 is a diagram illustrating an application example related to the light control element of the present invention.

Next, application examples of the light control element related to the present invention will be described in detail. The light control element of the present invention includes, as shown in FIG. 20, a substrate 1 having an electro-optic effect, a plurality of optical waveguides 2 formed on the substrate, and a control electrode 3 which is formed on the substrate and controls the phase of light propagating through the optical waveguides. The control electrode 3 includes at least two resonant type electrodes 31 and 32 having the same resonant frequency and feeding electrodes 41 and 42 which feed a control signal to the respective resonant type electrodes. A shape and a formation position of each of the resonant type electrodes 31 and 32, and a feeding point to each of the resonant type electrodes by the feeding electrode are set to perform odd mode coupling with each other. The feeding electrodes have a plurality of branched wiring sections 41 and 42 branched from a single input wiring section 40. The control signals having the same phase or a predetermined phase difference are fed to the respective resonant type electrodes by the branched wiring electrodes.

The substrate 1 having an electro-optic effect is the same as in the above-described embodiment, and, since a configuration in which the resonant type electrodes are disposed on the optical waveguides can be expected to perform the most effective modulation as in the light control element shown in FIG. 20, a Z-cut type substrate is preferable. In addition, materials, manufacturing methods, structures, and the like of the optical waveguide, the control electrode, and the resonant type electrode may use various techniques in the same manner as in the above-described embodiment.

In the light control element of the present invention, as shown in FIG. 20, a control signal is branched into two of which the phases are aligned and which are fed to the respective resonant type electrodes 31 and 32. The branched paths are disposed on the same substrate by adjusting refractive indexes of branched wirings such that the control signals of a frequency band which is resonant in the same phase are fed to the respective feeding points. Thereby, high-priced components such as a differential electrode or an external phase shifter are unnecessary. In addition, the frequency band refers to a band within 6 dB.

In a case where the impedance of the input wiring section 40, via which a signal is fed from an external device of the light control element (chip), is Z0, the impedance of each of the branched wiring sections 41 and 42 which are equally branched into two without a branching loss increases to 2Z0 in order to achieve impedance matching, as shown in FIG. 20.

In the present invention, the term "substantially twice" is shown, and this means that, although a twice-relationship can reduce a branching loss the most, the present invention is allowable even if an impedance value is slightly different from twice in a practical range in which operations and effects of the present invention can be expected. In addition, preferably, a desirable allowable range of the value of the impedance is restricted to within about +−20% of twice, and a desirable allowable range of the value of the reflection of electric signal is restricted to within about +−10%.

The branched control signals are supplied to the resonant type electrodes 31 and 32; however, the resonant type electrodes have different impedances depending on feeding points due to the feeding electrodes (branched wiring sections) 41 and 42 and thus have impedances from 0Ω to near infinity depending on points. For this reason, it is possible to match an impedance of the feeding electrode with an impedance of the resonant type electrode, and it is possible to perform appropriate feeding without a reflection loss, by selecting an appropriate feeding point regardless of the value of an impedance of the branched wiring section. This is a technique which can be further realized since a feeding destination is the resonant type electrode.

In a resonant type electrode of which an electrode length is longer than the wavelength of a signal, there are a plurality of excitation points which perform the same resonance operation. Therefore, in relation to feeding points, points which excite resonance of the same condition may be set as feeding points, and, combinations for adjusting a phase difference have many variations.

In a case where a shape of the MZ interferometer is used in the optical waveguide, in the related art, in order to reduce the influence of interference between control signals, it is necessary to increase a gap between the branched optical waveguides such that a gap between the electrodes (between hot electrodes) becomes 400 µm or more; however, there is no such necessity in the present invention. The gap may be equal to or less than 100 µm in which crosstalk is remarkable. For this reason, it is possible to realize miniaturization of the light control element.

A shape of the resonant type electrode has a coplanar (CPW) structure in which ground electrodes are disposed with a signal electrode interposed therebetween or so as to surround the signal electrode, and a manufacturing condition in which the velocity of a light signal propagating through the optical waveguide and the velocity of a control signal propagating through the electrode are approximately the same is used.

In a case where the velocities are approximately the same (the velocity matching condition is nearly satisfied), the length of the electrode can be made to be longer than the wavelength of a resonant frequency of the control signal, which is thus advantageous in reducing a driving voltage. Herein, a ridge type optical waveguide in which a control signal is effectively applied to the optical waveguide portion is used in order to further reduce a driving voltage. Naturally, even in an electrode with a non-CPW structure, or even in a non-ridge type waveguide, any electrode type or optical waveguide may be used in a configuration in which velocity matching is substantially satisfied.

In the light control element shown in FIG. 20, the resonant type electrode uses a shape in which both ends of a single signal electrode (resonant type electrode) are opened from the ground electrode. The feeding points are provided not at the center of the resonant type electrode but at asymmetric positions (not symmetric with respect to the straight line in the transverse direction of the figure) with respect to the upper and lower resonant type electrodes in consideration of an impedance of the resonant type electrode and an intensity and waveform of electric field vectors formed in the resonant type electrode as shown in FIG. 6.

Although, in FIG. 6, a feeding point uses a point closest to the center of the resonant type electrode among points where an impedance is 50Ω on the resonant type electrode, as described above, in a case where the feeding electrodes form two branched wiring sections branched from the input wiring section, typically, impedance matching with an external device is achieved at 50Ω, thus a feeding point of the resonant type electrode is a point where an impedance is mainly 100Ω, and a point closest to the center of the resonant type electrode is preferably set as a feeding point. An external driving circuit of the light control element can directly feed a control signal without using an impedance matching circuit in the present invention.

In addition, by setting a point closest to the center of the resonant type electrode as a feeding point, there is an advantage in that characteristic deviations that are caused by a change of shapes or the like of ends of the electrode due to a problem in reproducibility of manufacturing processes are smaller, compared with in a case where a signal is fed to edges of the electrode. In addition, since an electric field intensity distribution which each resonant type electrode applies to the optical waveguide can be made to be approximately the same, it is possible to suppress wavelength chirp.

As shown in FIG. 20, the two resonant type electrodes have the same shape, and are disposed at positions where the electrodes are in 180° rotation symmetry (point symmetry; refer to the fixed point O in FIG. 20) with respect to any point as a rotation center which is located on the plane at the same distance from interaction regions (regions where electric fields formed by the respective resonant type electrodes act on the optical waveguides) of the MZ interferometer. Each of the control signals with the same phase and the same magnitude is fed to a feeding point (feeding point) of a single signal electrode (31 or 32) of the resonant type electrode using the feeding electrode 41 or 42.

Figure 21:
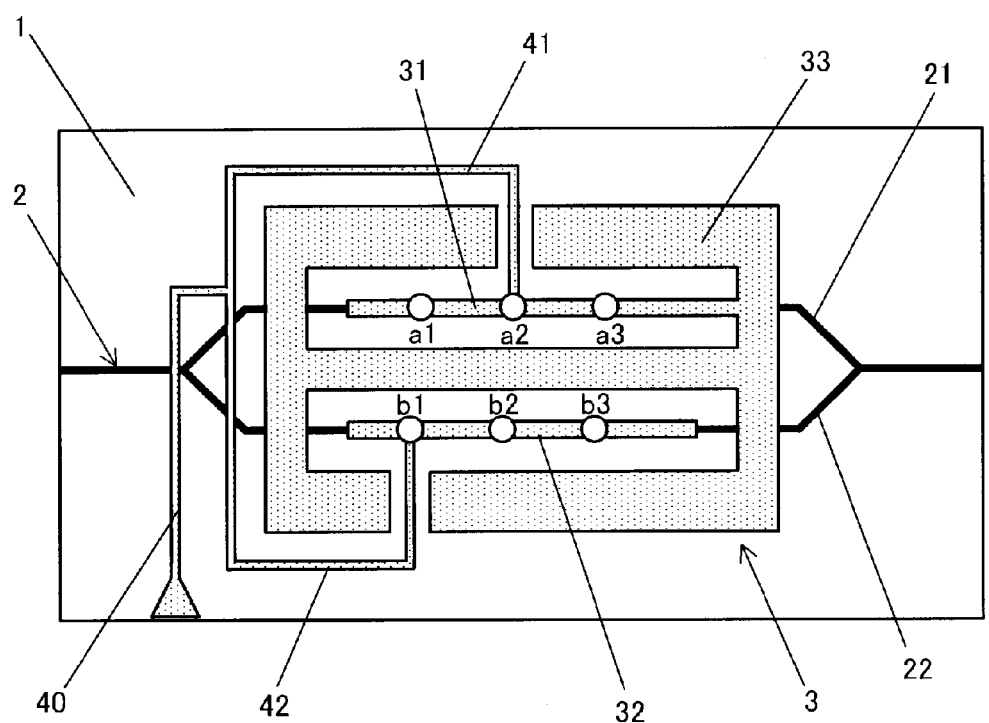
FIG. 21 is a diagram illustrating another application example related to the light control element of the present invention.

In addition, in a resonant type electrode of which an electrode length is longer than the wavelength of a signal, there are a plurality of excitation points which perform the same resonance operation. Although a point close to the center of the electrode is set as a feeding point in the example of FIG. 20, points where the same excitation operation as in the point is obtained may be selected as feeding points (any one of a1 to a3 and any one of b1 to b3 can be selected) as in FIG. 21. Therefore, in a case of the long resonant type electrode, there are various combinations in selecting the respective feeding points.

Figure 22:
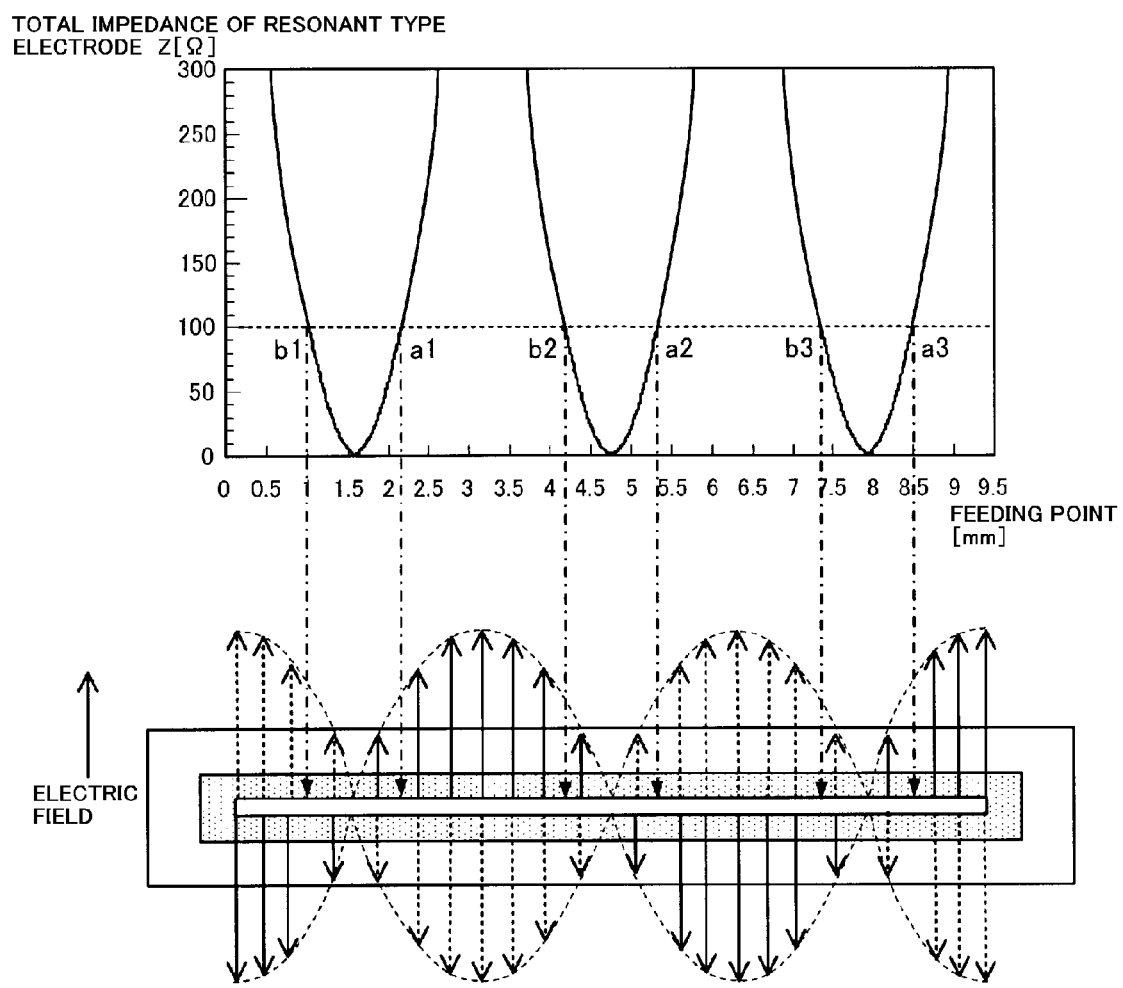
FIG. 22 is a diagram illustrating a relationship between a feeding point and an impedance, and a state of an electric field vector at a specific timing in a case where the length of the signal electrode (both ends of the signal electrode are opened from the ground electrode) of the resonant type electrode is 3λ/2 (where λ is a signal wavelength).

FIG. 22 is a diagram illustrating a relationship between a feeding point and an impedance, and a state of an electric field vector at a specific timing in a case where the length of a signal electrode (both ends of the signal electrode are opened from the ground electrode) is 3λ/2 (where λ is a signal wavelength) in a resonant type electrode having a single signal electrode. The resonant type electrodes have different impedances depending on feeding points, and thus have impedances from 0Ω to near infinity depending on points as shown in the graph on the upper side of FIG. 22.

In FIG. 22, there are three feeding points realizing an impedance of 100Ω in a single electric field vector pattern and a total of six points in consideration of a direction of the electric field as well. In addition, feeding points of the respective resonant type electrodes are set such that electric field vectors formed by the two resonant type electrodes face in opposite directions to each other as shown in FIG. 3.

As such, it is possible to perform impedance matching, and it is possible to perform appropriate feeding without a reflection loss, by selecting an appropriate feeding point, regardless of the value of an impedance of the branched wiring. A product of the length of each wiring and a refractive index of the wiring to the control signal is set to be the same in the respective branched wiring sections, and the control signal is configured to be input to the resonant type electrode in the same phase state.

A structure of the feeding electrode here uses CPW (a configuration in which the ground electrodes are disposed with the signal electrode interposed therebetween); however, CPS (a configuration in which the ground electrode is disposed on one side of the signal electrode), G-CPW (a configuration in which CPW is formed on a front surface of a substrate and a ground electrode is disposed on a rear surface of the substrate), a strip line, or a combination thereof may be used. In addition, in a case where a structure of the electrode is varied in the middle thereof in order to suppress a loss of a control signal, an impedance is set to be constant.

The resonant type electrodes may also be used any configuration of CPW, CPG and G-CPW. However, both of the resonant type electrodes preferably use an electrode configuration of the same structure in order to facilitate connection between the resonant type electrode and the feeding electrode. In addition, the branched wiring sections of the feeding electrode can be used as long as they electrically continue even if there is discontinuous wiring of a feeding line such as a coupler type or a hybrid type.

If the electrode disposition condition and the feeding condition of the control signals used by the light control element of the present invention are satisfied, since only odd modes are resonantly enhanced even if coupling arises between both the electrodes, the control signal on each resonant type electrode is not disturbed.

In a case where the MZ interferometer is used in the optical waveguide in the light control element of the present invention, a phase shift of light in each branched optical waveguide provides a reverse sign of the same magnitude, and thus ON and OFF pulse light signals having no wavelength chirp are generated in a light output portion of the MZ interferometer. These ON and OFF pulse light signals having no wavelength chirp are the most desirable characteristics for optical clocks.

In addition, in a case where the light control element of the present invention is used not as a resonant type modulator but as a light pulsar (optical clock generator), needless to say, a phase difference at the feeding points of the respective resonant type electrodes is made to not be zero (the same phase) but an integer multiple of 2π. In addition, as described above, by selecting feeding points which achieve a nearly equivalent effect and combining phase differences satisfying an integer multiple of 2π, a degree of freedom of a shape or a disposition of the control electrode (the resonant type electrode or the feeding electrode) increases, and a product design is also facilitated.

In addition, a length of a wiring required to shift a phase by 2π is the same as a gap between points achieving the same excitation effect on the resonant type electrode shown in FIG. 22 in a case of an electrode where a refractive index of the feeding electrode is the same as that of the resonant type electrode. Therefore, if the feeding electrode has substantially the same configuration as the resonant type electrode, it is convenient to dispose the feeding electrode.

Although, in the above description, a linear signal electrode (resonant type electrode) has been mainly described, the present invention is not limited thereto, and, in a case where the branched optical waveguide is curved or bent, the resonance electrode may be curved or bent according to the optical waveguide. In addition, the respective signal electrodes (resonant type electrodes) are not limited to a linear shape and may be a ring shape if the requirement is satisfied in which the electrodes achieve the same operation efficiency regarding the branched optical waveguides and are disposed at positions where odd mode coupling arises therebetween.

Figure 23:
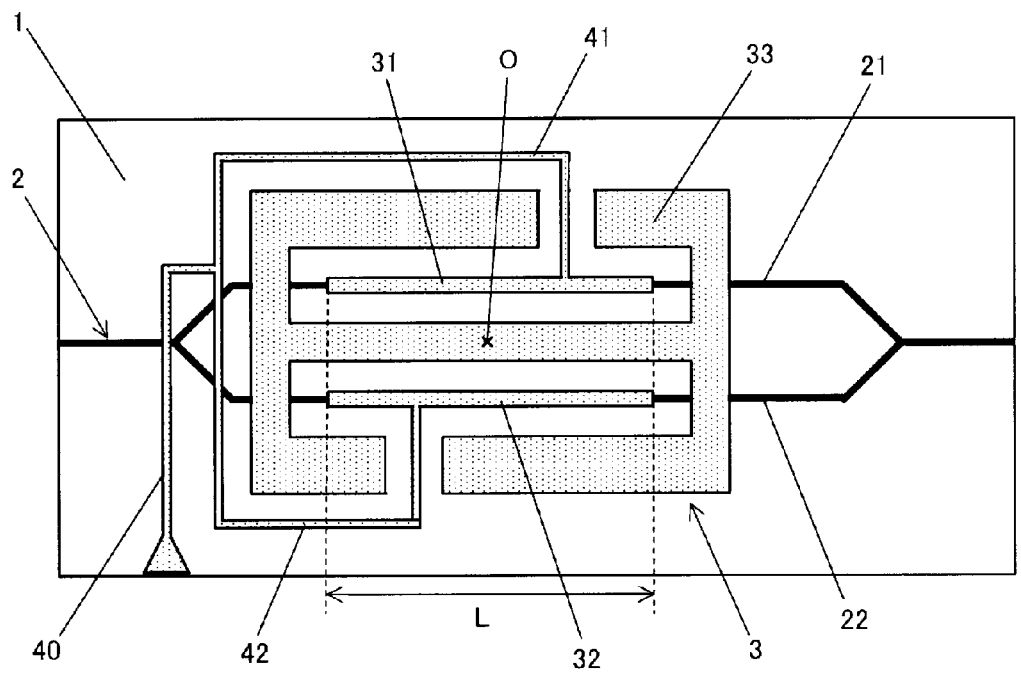
FIG. 23 is a diagram illustrating a configuration in which resonant type electrodes related to an application example of the present invention are unevenly disposed in a portion of the MZ interferometer.
Figure 24:
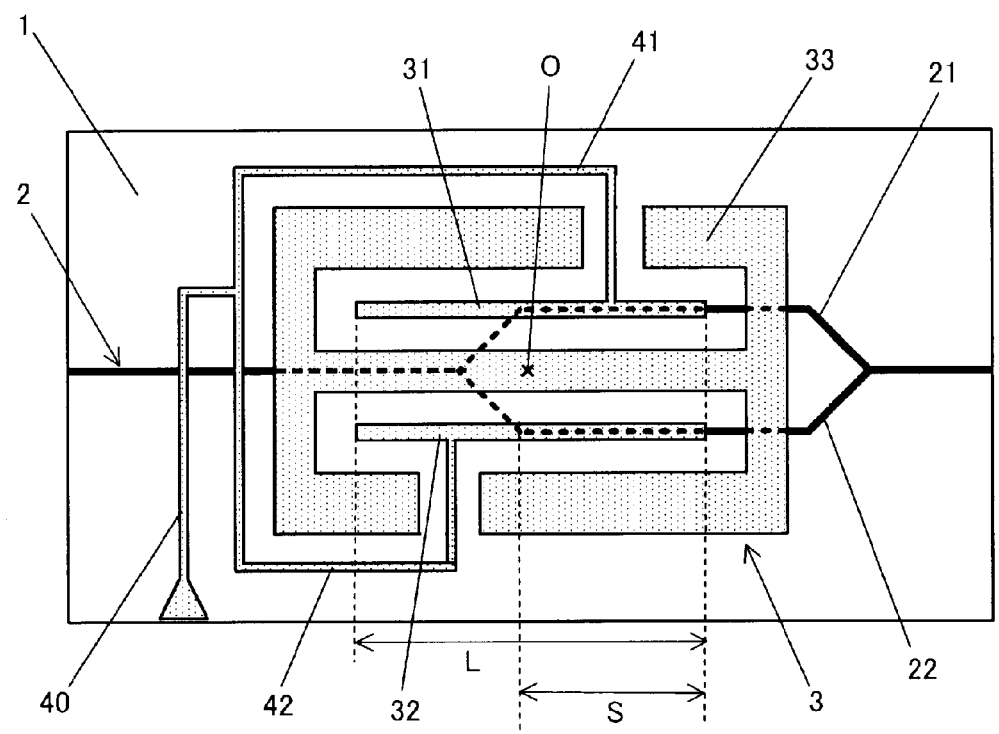
FIG. 24 is a diagram illustrating a configuration in which only a portion of the resonant type electrodes are interaction regions which act on optical waveguides.

In addition, as described above, positions of the resonant type electrodes with respect to the optical waveguides forming the MZ interferometer are not limited to disposing two resonant type electrodes so as to match the center of the MZ interferometer, and, for example, as shown in FIG. 23, there may be a configuration in which the resonant type electrodes 31 and 32 are unevenly disposed in a part of the branched waveguides of the MZ interferometer, or, as shown in FIG. 24, there may be a configuration in which only a part of the resonant type electrodes are disposed so as to overlap the branched waveguides, and thus the resonant type electrodes are disposed so as to include an interaction regions (the range S) acting on the optical waveguides and a non-interaction regions. In addition, in a case as in FIG. 24, a shape or a disposition of the resonant type electrodes of the non-interaction regions increases in a degree of freedom of design as compared with a case where the above-described entire resonant type electrode is an interaction regions.

Figure 25:
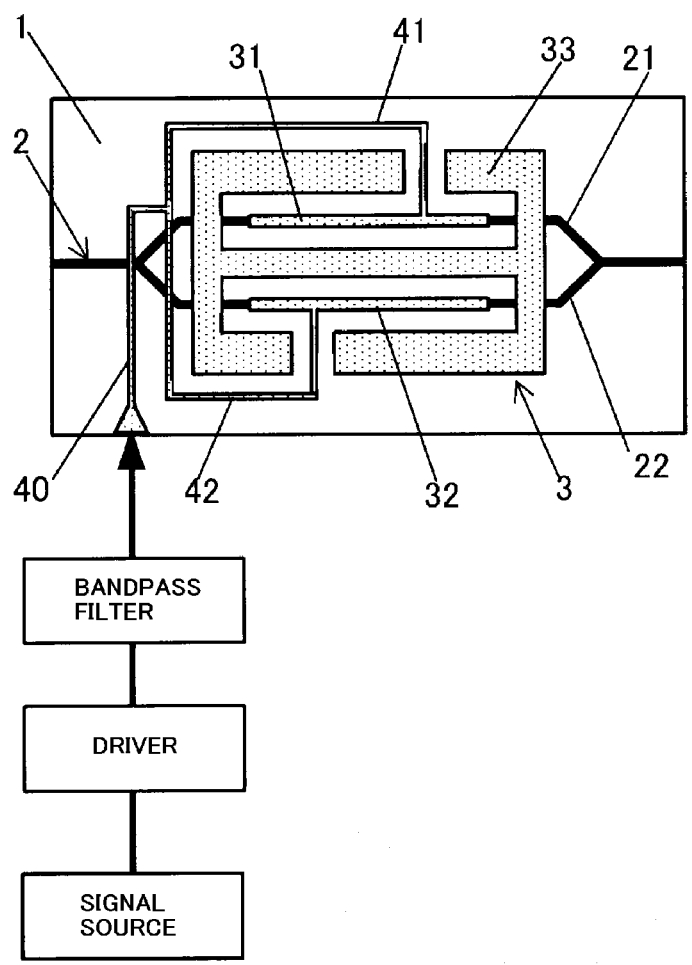
FIG. 25 is a diagram illustrating a state where a driving circuit is connected to the light control element related to an application example of the present invention.

To drive the light control element of the present embodiment, it is possible to configure with only a single driving circuit as shown in FIG. 25. As an example of the driving circuit, a signal with a predetermined frequency from a signal source is input to a driver so as to be amplified to a predetermined signal voltage which is input to the input wiring section 40 of the light control element via a bandpass filter for removing noise. In a light control element in which two series of control signals are fed with the same phase at the same magnitude unlike in the present invention, a differential driver, an external phase shifter, or the like is necessary, but the light control element of the present invention can be driven by only a single driving circuit and thereby it is possible to reduce costs of the overall device.

In the light control element of the present invention, it is possible to not only use a resonant type long electrode and a dual-electrode disposition structure together which cannot be used together in the related art, but also to achieve effects such as dramatic improvement in modulation efficiency and miniaturization due to reduction in a gap between electrodes by using crosstalk (coupling).

In a case where the light control element of the present invention is applied to a pulsar, the following effects can be expected.

Realization of high speed, ultralow voltage, and miniaturized pulsar

Innovative reduction in power consumption

Cost reduction for a user by the use of the low cost driving system

Decrease in size including peripheral circuits and improvement in an integration degree Cost reduction due to an increase in the number of devices from a wafer by the decrease in size

INDUSTRIAL APPLICABILITY

As described above, according to the present invention, it is possible to provide a light control element which can be stably operated at a low driving voltage, and, particularly, it is possible to provide a light control element which can be stably operated using two resonant type electrodes even if crosstalk (coupling) arises between both the electrodes. In addition, it is possible to provide a light control element capable of reducing costs by using low cost driving system components.

REFERENCE SIGNS LIST

1 SUBSTRATE HAVING ELECTRO-OPTIC EFFECT
2 OPTICAL WAVEGUIDE
21 AND 22 BRANCHED WAVEGUIDE
3 CONTROL ELECTRODE
31 AND 32 SIGNAL ELECTRODE (RESONANT TYPE ELECTRODE)
33 GROUND ELECTRODE
41 AND 42 FEEDING ELECTRODE

The invention claimed is:

1. A light control element comprising: a substrate having an electro-optic effect; a plurality of optical waveguides that are formed on the substrate; and a control electrode that is formed on the substrate and controls the phase of light propagating through the optical waveguides, wherein the control electrode includes at least two resonant type electrodes having the same resonant frequency; and feeding electrodes that feed a control signal to each of the resonant type electrodes, wherein a shape and a formation position of each resonant type electrode, and a feeding point to each of the resonant type electrodes by the feeding electrode are set to allow odd mode coupling with each other, wherein control signals having the same phase or a predetermined phase difference are fed to the respective resonant type electrodes by the feeding electrodes, and wherein each of the resonant type electrodes includes a single signal electrode and a ground electrode surrounding the signal electrode, and wherein two ends of the signal electrode are in any one state of (a) both of the two being opened from the ground electrode; (b) both of the two being short-circuited to the ground electrode; and (c) one end being short-circuited to and the other end being opened from the ground electrode.

2. The light control element according to claim 1, wherein the feeding electrodes have a plurality of branched wiring sections branched from a single input wiring section, and control signals are fed to the respective resonant type electrodes by the branched wiring sections.

3. The light control element according to claim 1, wherein the optical waveguides form a single or a plurality of Mach-Zehnder interferometers, and the two resonant type electrodes are disposed corresponding to two optical waveguides forming the Mach-Zehnder interferometer.

4. The light control element according to claim 3, wherein shapes and formation positions of the two resonant type electrodes and feeding points to the respective resonant type electrodes by the feeding electrodes are set to be in point symmetry with each other.

5. The light control element according to claim 1, wherein the control signals have a predetermined phase difference that is an integer multiple of $2\pi$ with respect to a control signal having a predetermined frequency.

6. The light control element according to claim 2, wherein an impedance of the feeding electrode in each branched wiring section and an impedance at the feeding point of each resonant type electrode are set to be substantially twice as much as an impedance of the feeding electrode in the input wiring section.

7. The light control element according to claim 1, wherein each of the resonant type electrodes has a single signal electrode, and a length of the signal electrode is longer than a wavelength of the control signal having a predetermined frequency on the signal electrode.

8. The light control element according to claim 1, wherein each of the resonant type electrodes has a single signal electrode, and a feeding point to the signal electrode is a point where an impedance of the resonant type electrode matches an impedance of the feeding electrode connected to the feeding point.

9. The light control element according to claim 1, wherein the feeding point is set to a position closest to a center of the resonant type electrode.

10. The light control element according to claim 2, wherein the optical waveguides form a single or a plurality of Mach- Zehnder interferometers, and the two resonant type electrodes are disposed corresponding to two optical waveguides forming the Mach-Zehnder interferometer.

11. The light control element according to claim 2, wherein the control signals have a predetermined phase difference that is an integer multiple of $2\pi$ with respect to a control signal having a predetermined frequency.

12. The light control element according to claim 3, wherein the control signals have a predetermined phase difference that is an integer multiple of $2\pi$ with respect to a control signal having a predetermined frequency.

13. The light control element according to claim 4, wherein the control signals have a predetermined phase difference that is an integer multiple of $2\pi$ with respect to a control signal having a predetermined frequency.

14. The light control element according to claim 2, wherein each of the resonant type electrodes has a single signal electrode, and a length of the signal electrode is longer than a wavelength of the control signal having a predetermined frequency on the signal electrode.

15. The light control element according to claim 3, wherein each of the resonant type electrodes has a single signal electrode, and a length of the signal electrode is longer than a wavelength of the control signal having a predetermined frequency on the signal electrode.

\* \* \* \* \*